United States Patent
Rohleder et al.

(10) Patent No.: US 11,366,689 B2
(45) Date of Patent: Jun. 21, 2022

(54) HARDWARE FOR SUPPORTING OS DRIVEN OBSERVATION AND ANTICIPATION BASED ON MORE GRANULAR, VARIABLE SIZED OBSERVATION UNITS

(71) Applicant: NXP USA, Inc., Austin, TX (US)

(72) Inventors: Michael Rohleder, Unterschleissheim (DE); George Adrian Ciusleanu, Marasesti (RO); David Allen Brown, Austin, TX (US); Marcus Mueller, Munich (DE)

(73) Assignee: NXP USA, Inc., Austin, TX (US)

( * ) Notice: Subject to any disclaimer, the term of this patent is extended or adjusted under 35 U.S.C. 154(b) by 564 days.

(21) Appl. No.: 16/427,910

(22) Filed: May 31, 2019

(65) Prior Publication Data
US 2020/0272512 A1    Aug. 27, 2020

(30) Foreign Application Priority Data
Feb. 26, 2019   (RO) ............................... a 2019 00132

(51) Int. Cl.
| | |
|---|---|
| *G06F 9/46* | (2006.01) |
| *G06F 9/48* | (2006.01) |
| *G06F 13/40* | (2006.01) |
| *G06F 13/16* | (2006.01) |
| *G06F 9/54* | (2006.01) |

(52) U.S. Cl.
CPC ............ *G06F 9/4881* (2013.01); *G06F 9/542* (2013.01); *G06F 13/1668* (2013.01); *G06F 13/4027* (2013.01)

(58) Field of Classification Search
CPC .................................................. G06F 9/4881
USPC ......................................................... 718/103
See application file for complete search history.

(56) References Cited

U.S. PATENT DOCUMENTS

| | | | | |
|---|---|---|---|---|
| 6,230,200 | B1 * | 5/2001 | Forecast | G06F 9/50 709/219 |
| 9,205,743 | B2 * | 12/2015 | Rahe | B60K 37/02 |
| 9,781,120 | B2 * | 10/2017 | Rohleder | G06F 21/79 |
| 10,120,713 | B2 * | 11/2018 | Rohleder | G06F 12/0862 |
| 10,120,819 | B2 * | 11/2018 | Rohleder | G06F 12/0895 |

(Continued)

OTHER PUBLICATIONS

Ahmadinia, Ali, "Integrated Scheduling and Configuration Caching in Dynamically Reconfigurable Systems," IEEE 2010 International Conference on Intelligent and Advanced Systems, Jun. 15-17, 2010; 6 pages.

(Continued)

*Primary Examiner* — Mehran Kamran

(57) ABSTRACT

A processor scheduling structure, a method and an integrated circuit are provided. In accordance with at least one embodiment, the processor scheduling structure comprises a processor circuit and an operating system task aware caching (OTC) controller circuit coupled to the processor circuit. The OTC controller circuit comprises a load request timer, a load sequence queue (LSQ), and a request arbiter. The timer and the LSQ are coupled to and provide inputs to the request arbiter. The processor circuit comprises an internal memory and a processor core. The OTC controller circuit is configured to schedule processor tasks for the processor circuit in accordance with both priority-based scheduling, using the LSQ, and time-triggered scheduling, using the load request timer.

19 Claims, 9 Drawing Sheets

(56) References Cited

U.S. PATENT DOCUMENTS

| | | | |
|---|---|---|---|
| 10,719,357 B1* | 7/2020 | Rohleder | G06F 9/3802 |
| 10,740,237 B2* | 8/2020 | Kovalev | G06F 12/0842 |
| 11,126,573 B1* | 9/2021 | Rohleder | G06F 13/1668 |
| 2004/0143710 A1* | 7/2004 | Walmsley | G06F 21/575 |
| | | | 711/144 |
| 2014/0094940 A1* | 4/2014 | Ghassemzadeh | G06F 1/1694 |
| | | | 700/91 |
| 2015/0016298 A1* | 1/2015 | Ganichev | H04L 43/0894 |
| | | | 370/253 |
| 2015/0370738 A1* | 12/2015 | Godard | G06F 13/4022 |
| | | | 710/317 |
| 2016/0054460 A1* | 2/2016 | Jackson | G01V 1/008 |
| | | | 342/357.51 |
| 2017/0223144 A1* | 8/2017 | Kremer | H04L 67/42 |
| 2018/0011735 A1* | 1/2018 | Singer | G06F 9/48 |
| 2018/0011736 A1* | 1/2018 | Rohleder | G06F 9/3842 |
| 2019/0079877 A1* | 3/2019 | Gaur | G06F 12/0811 |
| 2019/0311748 A1* | 10/2019 | Rohleder | G11C 5/147 |
| 2020/0107226 A1* | 4/2020 | Raleigh | H04W 28/10 |
| 2020/0319884 A1* | 10/2020 | Rohleder | G06F 11/3466 |
| 2021/0216445 A1* | 7/2021 | Rohleder | G06F 12/0238 |

OTHER PUBLICATIONS

Chughtai, M. et al., "An Approach to Task Allocation for Dynamic Scheduling in Reconfigurable Computing Systems," IEEE INMIC 2005 9th International Multitopic Conference; Dec. 24-25, 2005; 6 pages.

Fekete, S. et al., "Scheduling and Communication-Aware Mapping of HW/SW Modules for Dynamically and Partially Reconfigurable SoC Architectures," IEEE 2007 20th International Conference on Architecture of Computing Systems, Mar. 15, 2007; 9 pages.

Jozwik, K. et al., "Rainbow—An OS Extension for Hardware Multitasking on Dynamically Partially Reconfigurable FPGAs," IEEE 2011 International Conference on Reconfigurable Computing and FPGAs, Jun. 2011; 6 pages.

Tabero, J. et al., "Task Placement Heuristic Based on 3D-Adjacency and Look-Ahead in Reconfigurable Systems," IEEE Asia and South Pacific Conference on Design Automation, Jan. 24-27, 2006; 6 pages.

Schmidtmann, U. et al., "Microprogrammable Hardware Abstraction Layer for Flexible Automation," IEEE Conference on Emerging Technologies and Factory Automation; Sep. 22-25, 2009; 7 pages.

Notice of Allowance for U.S. Appl. No. 16/428,058 dated May 18, 2020, 10 pages.

U.S. Appl. No. 16/869,249, filed May 7, 2020, 40 pages.

* cited by examiner

HARDWARE FOR SUPPORTING OS DRIVEN OBSERVATION AND ANTICIPATION BASED ON MORE GRANULAR, VARIABLE SIZED OBSERVATION UNITS

CROSS-REFERENCE TO RELATED APPLICATION(S)

This application claims priority to Romanian Application No. A201900132 filed on Feb. 29, 2019, the entirety of which is hereby expressly incorporated by reference.

The present application is related to co-pending U.S. patent application Ser. No. 16/428,058 entitled "Hardware for Supporting OS Driven Load Anticipation Based on Variable Sized Load Units" filed on May 31, 2019, the entirety of which is herein incorporated by reference.

FIELD OF THE DISCLOSURE

The subject matter of the disclosure relates generally to information processing systems and more particularly to an apparatus to support scheduling of operations to be performed within an information processing system.

BACKGROUND

An information processing system processes information in accordance with control information, such as executable instructions to be performed by a processor of the information processing system. An external memory provides corresponding instructions and data that are buffered within an internal memory of smaller size. Loading the instructions and data to be processed by the information processing is performed under an operating system (OS) that controls this processing. Since the performance of an information processing system can be affected by such loading, especially by the order in which different portions of the information are processed, the granularity of these portions, and the interactions between hardware and software to perform the loading, an efficient approach for the scheduling of these operations is needed. Another important aspect is the observation of the processing of these portions, by providing a matching observation granularity (equal to a portion size or aligned with portion boundaries) and without imposing extra overhead for this observation. Such a capability may also be used for other purposes since the portions of the information to be processed can be selected according to varying criteria, not only for the purpose of specifying a unit for the loading of instructions and data.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items. Different reference symbols are used in cases where a different viewpoint of the same item is being described, e.g., conceptual viewpoint vs. implementation; in this case, the relation respective difference is provided in the descriptive text.

DETAILED DESCRIPTION OF THE DRAWINGS

An apparatus for scheduling of operations to be performed within an information processing system, comprising a scheduling structure, and a method implemented within an operating system task aware caching (OTC) subsystem within an integrated circuit. The apparatus, scheduling structure, method, and its integration provide a fine granular scheduling of operations in relation to tasks to be performed within an information processing system. The granularity of this scheduling is smaller than the task granularity utilized by an operating system (OS). In accordance with at least one embodiment, the scheduling structure comprises a load sequence queue (LSQ), a request arbiter, and a task information container. The integrated circuit is configured to schedule operating system tasks in accordance with one or more scheduling algorithms, including at least priority based scheduling. The apparatus is capable of providing corresponding anticipation operation(s), using a scheduling structure utilizing a load sequence queue, and optionally other elements supporting further anticipation algorithms providing a plurality of anticipation requests that are arbitrated by a request arbiter. In addition, this apparatus is configured to generate one or more observation events for changes within the finer granular structure of the instructions and data associated with a task currently being processed within the information processing system and to specify the execution of a specific operation that is associated with such an event.

Figure 1:
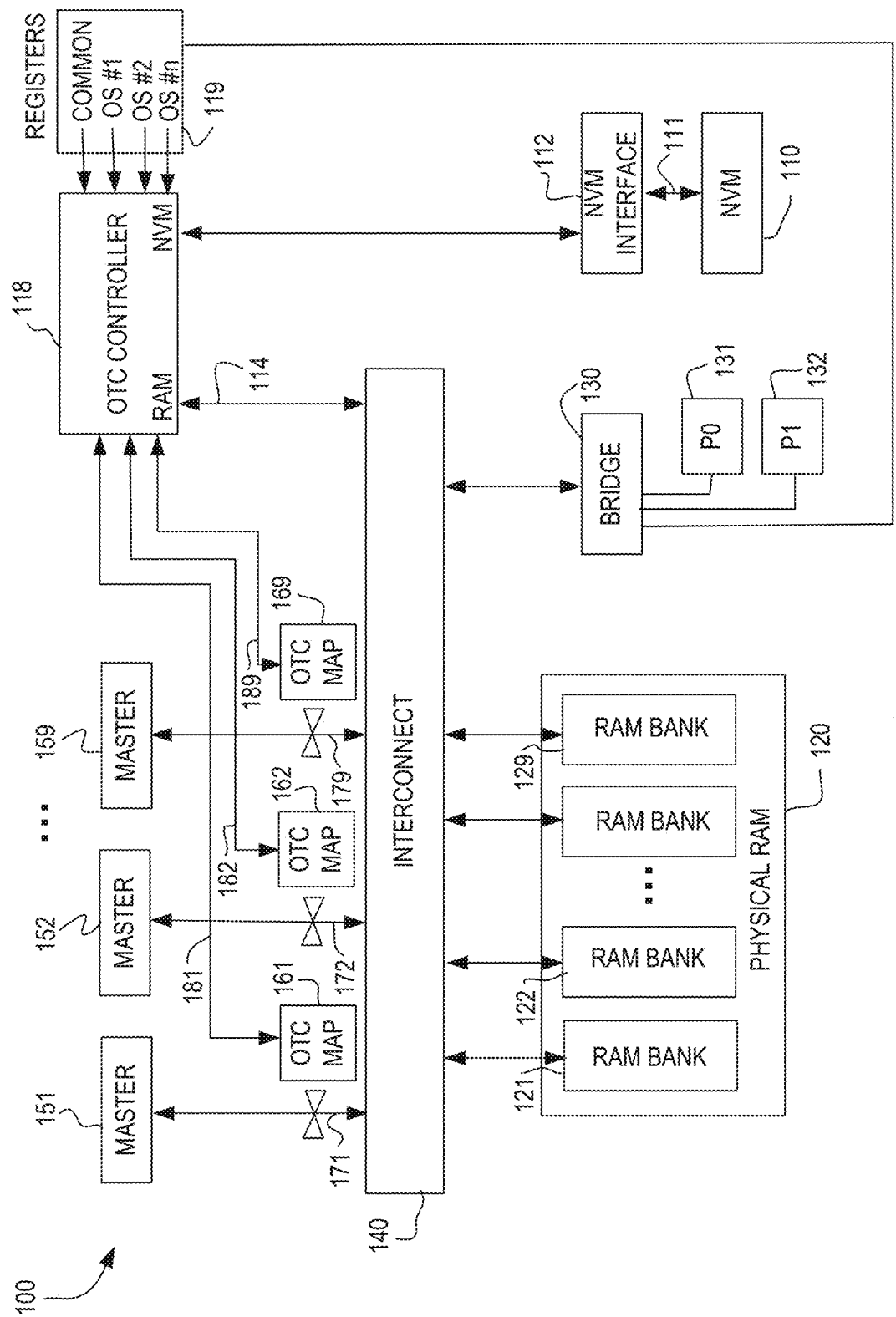
FIG. 1 is a block diagram illustrating the elements of an apparatus comprising an operating system task aware caching (OTC) subsystem for scheduling of operations to be performed within an information processing system in accordance with at least one embodiment.

FIG. 1 is a block diagram illustrating the elements of an apparatus comprising an operating system task aware caching (OTC) subsystem for scheduling of operations to be performed within an information processing system in accordance with at least one embodiment. Accordingly, FIG.

1 provides an example of an integration of one or multiple instances of these elements (the OTC Controller and OTC monitoring, address translation, and protection (further abbreviated as MAP) instances) with the actual processing elements of an integrated circuit 100, which will often implement a system-on-a-chip (SoC) architecture. The set of operations to be scheduled by this apparatus is related to supporting the software execution within such an integrated circuit by one or more observation or anticipation operations, e.g., a form of pre-loading related instructions or data before they are utilized, executed or otherwise being processed.

The integrated circuit (IC) 100 comprises a plurality of processing structures, like processor cores or other bus masters (e.g., a direct memory access (DMA) controller or a coprocessor) depicted in an exemplary manner as bus masters 151, 152, through 159. Any number of bus masters (one or multiple) and any type of bus master (e.g., a processor core, coprocessor, or peripheral that can act as a bus master) may be implemented. These processing structures are connected to an interconnect 140 (which may be a single interconnect or a set of specific interconnects) via a plurality of bus interfaces depicted in an exemplary manner as bus interfaces 171, 172, through 179. The interconnect 140 connects these bus masters to bus slaves responding to access requests, like an internal memory 120 or peripherals represented in an exemplary manner by P0 (131) and P1 (132) which are often connected to the interconnect via a specific peripheral bridge (130). In many cases, the internal memory 120 is built from multiple memory blocks, which may be organized in random access memory (RAM) banks, here shown in an exemplary manner as RAM banks 121, 122, through 129.

The integrated circuit 100 comprises an apparatus comprising an operating system task aware caching (OTC) subsystem for scheduling of operations, which is incorporated, for example, into a controller. In this example, this subsystem comprises a controller that is referred to as an operating system task aware caching (OTC) controller 118. This controller is capable of accessing an external memory 110, which can, for example, be a non-volatile memory (NVM). For an actual access to this memory, the apparatus may employ a NVM interface block 112, which is connected to OTC controller 118 and which implements the access protocol expected by the external memory, to which it connects via an access bus 111. This NVM interface block 112 may be a separate block on the integrated circuit, or integrated within the controller 118. Upon an access request by the controller 118, the data retrieved from the external memory 110 is stored into an internal memory, e.g., the memory 120. Related accesses may be performed by a further connection 114 to the interconnect 140 or via a separate, direct connection from the controller 118 to an internal memory 120.

The controller 118 adjusts the scheduling of operations by taking into account the progress of the execution by the bus masters 151, 152 through 159. Accordingly, the OTC subsystem further employs observer elements (further named OTC MAP, which is an abbreviation for monitoring, address translation, and protection) depicted in an exemplary manner as observers 161, 162, through 169, which observe the bus transactions of the bus master at the corresponding bus interfaces 171, 172 through 179. There is an observer for every bus master or for every bus interface; e.g., the observer 161 observes the transactions of the bus master 151 accessing the interconnect 140 via the bus interface 171. Other topologies are also possible; e.g., multiple masters may share a single bus interface, or a single master may utilize multiple bus interfaces (e.g., the instruction and data bus of a Harvard architecture). The observation results of these observers are provided to the controller 118 via dedicated feedback paths depicted in an exemplary manner as dedicated feedback paths 181, 182 through 189, which may also be used bidirectionally by the controller 118 to provide control information to the observers 161, 162 through 169.

This control information may be utilized to reduce the amount of notifications about observation events provided by observers 161, 162 through 169. Accordingly, one embodiment may provide the observers with further information about the one or multiple load units, or a subset of these. Related data may be, for example: an identifier and the address range occupied by a load unit with further metadata. Utilizing this information, an observer is capable of identifying a transition from one load unit to another one, which permits reducing the amount of notifications significantly.

The scheduling of operations performed by the apparatus described, for example, by the OTC subsystem utilizes an anticipation algorithm to determine an anticipation operation. This anticipation algorithm relies on information about task state changes provided by an operating system (OS) scheduler that is utilized at least by the processor cores within the bus masters. Other bus masters may not employ such a relationship. There may be a separate OS scheduler instance executed by every processor core, or an OS scheduler may be shared by multiple cores. Whenever an OS scheduler identifies a relevant task state change, it notifies the controller 118 via its register interface 119. Accordingly, the controller 118 may employ one or multiple concurrently accessible register interfaces, where each register interface may be treated similarly to other peripherals Pi (e.g., P0 131 and P1 132).

A relevant task state change is a state change of one of the tasks managed by the apparatus for the scheduling of operations, which is described further below in a paragraph related to FIGS. 3 and 4. Not all changes in the state of a task may be relevant, and not all tasks managed by an OS scheduler instance may be relevant. As will be described later, the controller 118 may be notified of a subset of these changes, e.g., a change in the priority of a task, or a change in the status from "runnable" to "not runnable" or vice-versa, instead of being notified of all changes in the state of the task, including those that may not be relevant. A task is defined to be in the state "runnable" when the prerequisites for execution of the task by a processor core have been met.

One aspect depicted by FIG. 1 is the independent, concurrent processing. For example, the loading of data from the external NVM can be performed independent of the processing being performed by execution of software by the information processing system, which may itself be several software threads executed on multiple bus masters. On one side are the bus masters that can interact with bus slaves like a memory or peripherals over an interconnect, such as a multi-processor circuit interconnect. Related observation and anticipation operations, like the loading of the load units can also be performed independently. The potential concurrency of those operations is dependent on the corresponding hardware that is performing such an operation. Accessing an external memory may be concurrent to any other operation. A potential collision may arise when writing the loaded data into the internal memory. Here a conflict between an access by one of the bus masters and the write operation is possible but can be overcome, e.g., by using a multi-ported memory or by utilizing a specific memory architecture, like memory interleaving, that enables multiple concurrent accesses.

Another aspect is the minimal interaction with non-specialized elements that is sufficient for the apparatus for the scheduling of operations to become functional. Observation of the processing by the one or more bus masters and a register interface is sufficient to receive notifications about the relevant task state changes. The observation of the processing is implemented by the observers 161, 162 through 169 which provide related notifications to the controller 118, which also implements the register interface 119 of the exemplary embodiment.

Figure 2:
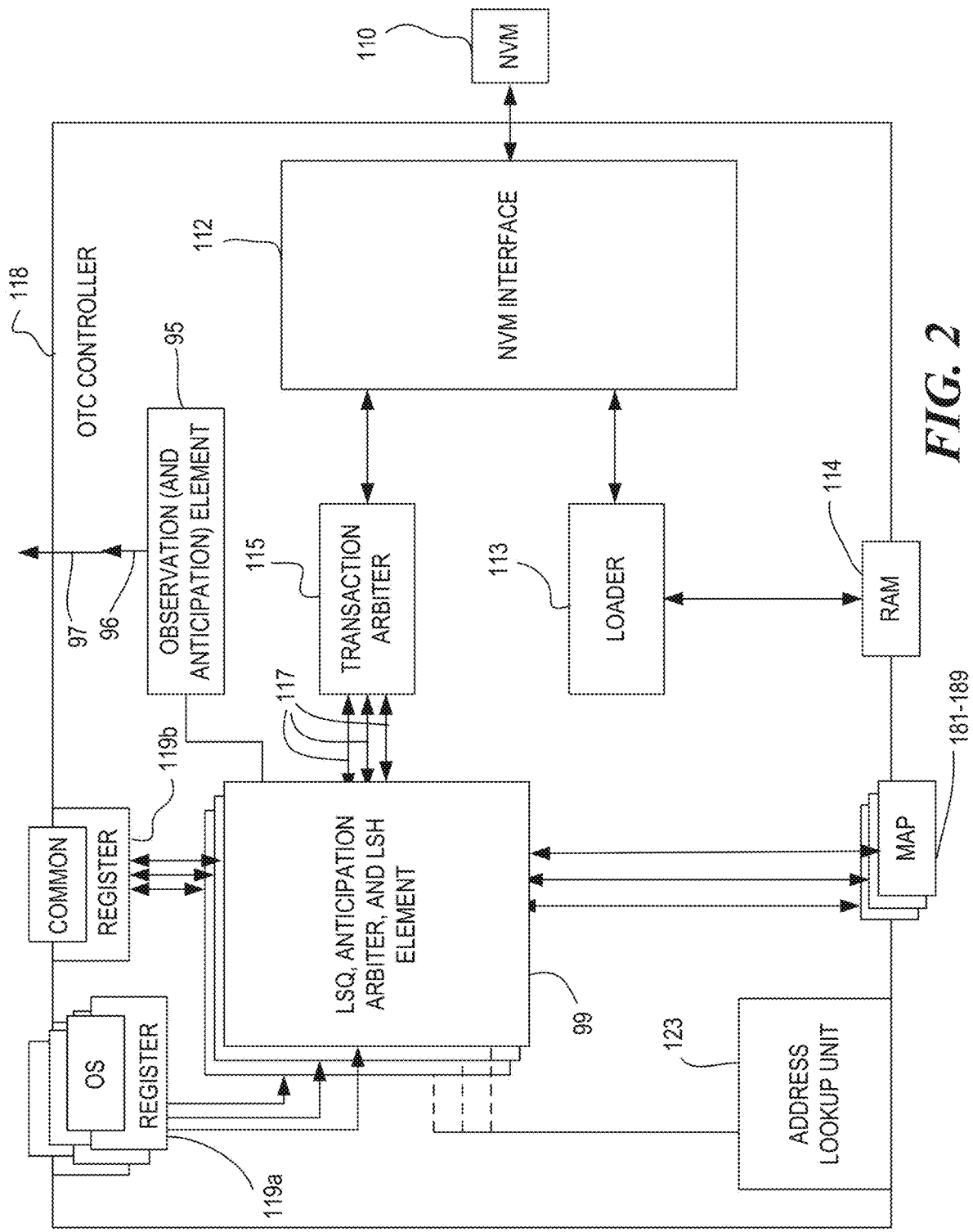
FIG. 2 is a block diagram illustrating further details of the controller element of an operating system task aware caching (OTC) subsystem in accordance with at least one embodiment.

FIG. 2 is a block diagram illustrating the implementation of the controller 118 of an apparatus for scheduling of operations in accordance with at least one embodiment. FIG. 2 shows only modules of interest within this controller 118. Other modules within the controller 118 that are not relevant are not shown.

In this example, multiple bus masters may be supported, which may require to also replicate related hardware blocks to support those bus masters. The controller 118 employs one or more MAP interface ports to connect to the control and feedback signals 181, 182 through 189 which are used to interact with the OTC MAP observers 161 to 169 (not shown). It also connects to a set of register interfaces, which may be either a dedicated interface for a single bus master or processor core 119*a* or a register interface that is shared between multiple masters 119*b*. Of course, a dedicated register interface 119*a* would be replicated for every bus master of the supported type. Any combination of those two register interface types may be used to support different bus masters.

Both interface types, the observation interface MAP and the register interface(s) interact with an internal control logic 99, which employs an apparatus comprising a scheduling structure. The logic 99 may also be replicated within the controller 118 to support the multiple bus master elements. This internal control logic 99 employs the scheduling structure disclosed in detail further below. The internal control logic 99 also communicates with a further element within the OTC controller 118, the address lookup unit 123. This unit comprises a circuit which manages a cross-reference table that can be utilized to identify the load unit that is referenced by an observed address. In accordance with at least one embodiment this table can be implemented within an internal memory that can be used to perform an address lookup, by using a specific lookup pattern. For example, the address lookup may be performed with the granularity of a memory page (when using a fixed size address map), with the granularity of a load unit (when using address ranges), or with any combination thereof. Another embodiment may implement such a table within the RAM and use a search algorithm (e.g., a binary search) implemented in hardware to perform a corresponding lookup operation. The main purpose of the address lookup unit 123 is the identification of a load unit in relation to an address provided by one of the observer elements; which is of course dependent on the internal representation utilized for recording these relationships (load unit and the address range it does occupy).

In accordance with at least one embodiment, the apparatus for scheduling of operations is capable of observing the execution of a task performed within an information processing system at a finer granularity. For this purpose, the scheduling structure within the internal element 99 can be configured to generate one or multiple events for relevant changes defined for smaller units; e.g., observation units having a finer granularity than a task, as is the case for the example of the already referenced load units. Corresponding events may be an observation event, e.g., an event that is triggered when entering and another event when leaving such an observation unit. Another kind of event may be an anticipation event, which requests an anticipation operation for an observation unit or a subsequent observation unit in accordance with some order criterion or criteria. Any of the corresponding events (e.g., enter event, leave event, or anticipation event), any unit relationship (e.g., the current or the next unit to be processed), and also any corresponding operation to be executed or order criterion may be hard-coded or specified in metadata for an observation unit (and, as such, be observation unit specific; e.g., it is possible to define different operations for different units). The corresponding metadata can be provided to the internal element 99 or read by this element from the RAM, e.g., by accessing a metadata information table holding the related information that is accessed utilizing an identifier that is determined from the address lookup unit 123.

In accordance with at least one embodiment, the apparatus for scheduling of operations may comprise a further hardware element, such as an anticipation or observation element 95 that is performing a corresponding observation function on request by the scheduling structure implemented within the internal element 99. An example for a corresponding observation element in accordance with at least one embodiment is a timer control element that starts a timer upon entering an observation unit and stops this timer upon leaving this observation unit. In addition, such an element can record the timer value of the stopped timer by writing it into the associated metadata via a direct memory access (DMA) functionality. Such a capability can be utilized beneficially to perform some profiling with a fine granular that is specified by the associated metadata. Another example for an anticipation or observation element 95 in accordance with at least one embodiment can be an element that manages a set of hardware resources, e.g., by locking the required resources upon entering an observation unit, and by releasing them upon leaving this observation unit. Related resources may be, e.g., memory protection information, or control information utilized by a virtual machine, or the hardware resources required or utilized by an OS scheduler. Such an observation and anticipation element 95 may also implement an anticipation operation that checks the availability of these resources upfront and generates an error response when these are used elsewhere, marks such resources as needed soon, or issues a release request as an internal signal 96. Such an operation may also trigger an external hardware element by an external signal 97, such as an event signal or a software interrupt, to perform some related activity. Supported by corresponding hardware, such a fine granular observation and anticipation capability enables a beneficial support of an application execution at a very fine granularity with a specific operation for every observation unit. Since both (the observation granularity and the set of associated functions) can be defined by metadata, the possible set of supported operations is only limited by the hardware made available for implementing these operations and may also include the triggering of software functions via an interrupt request. The corresponding processing may also include internal status information available within the internal element 99 or the associated anticipation and observation element 95.

In accordance with at least one embodiment, a corresponding anticipation operation may be an anticipation load operation of at least one load unit (for this purpose we refer to observation units as load units). Such an anticipation operation may include load units of the currently running task, but also load units related to lower priority tasks. Such an anticipation operation is beneficial because a lower priority task can quickly become the running task, e.g., when the running task is pre-empted, is waiting for a resource, or is terminated. Such an anticipation operation is also an example for the processing of multiple anticipation operation requests that can be processed by only a single hardware resource like the external NVM. In this example, the NVM interface block 112 is integrated within the controller 118 and interfaces with the external memory 110 for loading load unit data. Other embodiments may implement the NVM interface block 112 as a separate element, as stated earlier. Any data related to a load unit being loaded by the NVM interface block 112 is provided to a loader 113 that forwards this data with the appropriate write operations over the RAM port to the interface bus 114 to an internal memory (not shown). When there are multiple internal control logic 99 elements employed within the controller providing one or more anticipation requests, a transaction arbiter 115 may be provided to identify the next anticipation request to be served by the load logic implemented by the singular NVM interface block 112. This transaction arbiter 115 is connected to any of the internal control logic 99 and selects one of the provided anticipation requests 117 to be processed next. This selection process can utilize a simple round robin scheme or any more complex arbitration algorithm optionally on information provided by the internal control logic 99. The selection capability can support multiple instances of load anticipation mechanisms operating concurrently, as may be implemented to support a plurality of bus masters.

Figure 3:
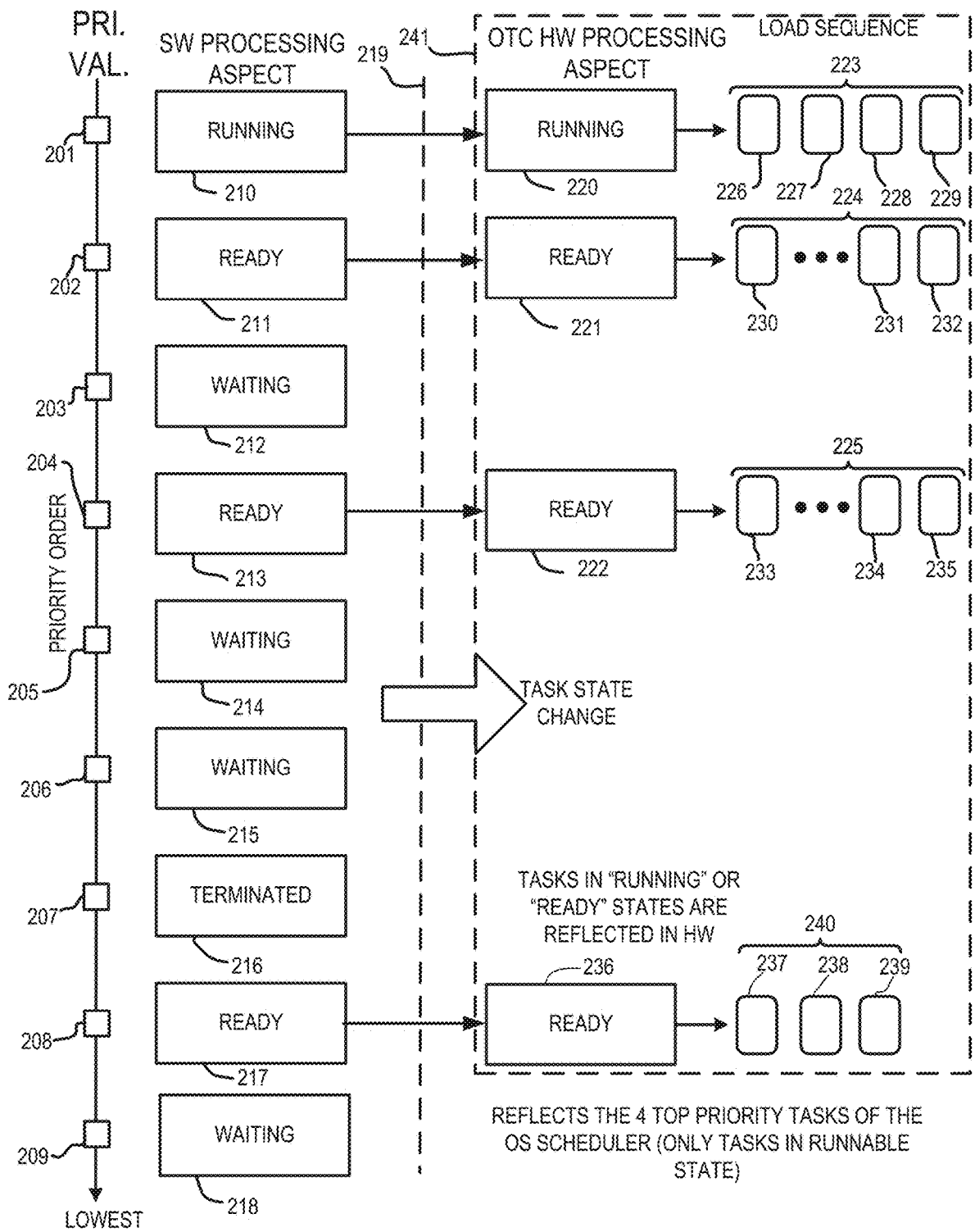
FIG. 3 is a diagram illustrating the relationship of the tasks managed by an apparatus comprising a scheduling structure with the tasks managed by an OS scheduler in accordance with at least one embodiment.

FIG. 3 is diagram illustrating the relationship of the tasks managed by an apparatus comprising a scheduling structure with the tasks managed by an OS scheduler in accordance with at least one embodiment. Accordingly, FIG. 3 illustrates the handling of priority based scheduling information by software (a SW processing aspect) (e.g., an OS scheduler) at the left side, and the corresponding processing by an internal hardware (a HW processing aspect) element 99 within the controller 118 at the right side.

As an example, the software side can use a data structure to define the set of tasks and their priority order to be managed by an OS scheduler. A task within the set of tasks can be specified by a certain number of attributes, of which the task state and the task priority are of particular relevance. FIG. 3 illustrates this software aspect exemplarily on the left side by a plurality of tasks 210-218, which also indicates the task state using a naming convention for such states (e.g., RUNNING, WAITING, TERMINATED, READY) that is similar to the one used by the AUTOSAR OS standard. Before being started and after termination, a task cannot run (TERMINATED). When waiting on an alarm, an event, or a resource, a task cannot run (WAITING). Of all tasks that are runnable (in condition to be executed) (e.g., tasks 210, 211, 213 and 217), the highest priority task (e.g., task 210) is a currently running task, referred to as RUNNING. All other runnable tasks (e.g., tasks 211, 213, and 217) are in a ready-to-run state, referred to as READY. In addition, the left side illustrates the priority order of those tasks by a priority value 201-209 assigned to every task. Priority may be assigned statically or may change dynamically. Although this FIG. 3 shows nine tasks, there may be any number (e.g., dozens or hundreds) of tasks managed by an OS. As described earlier the set of task states can be categorized along a single criterion "runnable", which identifies whether there is something that prevents a task from being executed. A runnable task is selected for execution when there is no higher priority runnable task, which is then selected instead. Any task that does not fulfil the "runnable" criteria cannot be selected, since something else prevents its execution. In the AUTOSAR notation any runnable task has the state READY, only the highest priority runnable task has the state RUNNING.

Relevant aspects of this software aspect have to be reflected within the operating-system-aware task cache (OTC) subsystem 241. OTC subsystem 241 comprises memory, such as internal memory 120, storing a plurality of task-related information reflecting relevant properties of the (exemplary) tasks 210-218. A subset of the runnable tasks 210-218 is communicated to the hardware of the OTC subsystem 241 via boundary 219, which is usually implemented by a software application programming interface (API) which interacts with the hardware side via registers and interrupts. This boundary is also used to present information about a task state change, to the OTC subsystem 241. Using this boundary, relevant aspects of the selected subset of runnable tasks are communicated to the hardware side and recorded within internal storage elements; in the example of FIG. 3, this is done for the four highest priority runnable tasks in the storage elements 220, 221, 222, and 236. Relevant information is, for this purpose, obtained from the tasks information 201-218. As shown, the highest priority runnable task 220 at the HW side is related to the running task 210 at the SW side (the one currently being executed), while tasks 221, 222, and 236 are reflecting lower priority runnable tasks 211, 213, and 217. These runnable tasks are tasks for which prerequisites for execution by a processor core have been met, but there is a higher priority runnable task (the RUNNING task). In a particular embodiment, tasks 220, 221, 222, and 236 are selected as the four highest priority runnable tasks from tasks 210-218. Tasks that are not runnable, for example, tasks that are waiting for resources, are not selected for processing at the hardware side by the software element implementing the boundary 219 to the hardware side of the OTC subsystem 241.

Another important aspect that is illustrated in FIG. 3 is a change in abstraction. The software side manages the software execution at the task level, while the hardware side manages the observation and anticipation respective load operations via what are termed load units. A load unit is a segment of executable code associated with a task that reflects one or more complete software functions within a contiguous address range. A load unit may be produced manually during the software development process or by a tool or tool flow that provides the corresponding functionality, e.g., by splitting the object code associated with a task along function boundaries. Size restrictions can be defined for load units, e.g., for an exemplary embodiment a minimum size of 1 Kbyte and a maximum size of 63 Kbyte. Other restrictions (e.g., an address alignment of the start or end address) are not required. The definition of load units and the above restrictions permit simplifications in implementation of the hardware side and a more uniform processing of the related operations, since the hardware, such as an apparatus implementing the anticipation scheduling, is no longer required to manage a wide variety of task sizes and implementation styles if so implemented by the software object code. Such organization also enables a faster reaction, e.g., a faster load process, because features organized as described above can limit the time required for a load transaction to the size of a load unit, thus enabling a more granular observation or load process and associated check and validation functionalities. Using the definition of a load unit set forth above, the object code of any task can be split into a set of load units. The preferred order for processing those load units is defined by what is termed a "load sequence," which is defined for each task as illustrated in FIG. 3 by the load sequences 223-225 and 240. Any load sequence may comprise an arbitrary amount of load units (at least one), which are defined in form of a sequence that specifies the load order. In this function, the load sequence is an example for implementing a specific order criterion for an anticipation operation that spans the multiple load units of a task.

This is also illustrated in FIG. 0.3, by associating the set of tasks managed by the hardware side with the corresponding load sequence. For the running task 220, a load unit sequence 223 of a plurality of load units 226, 227, 228, and 229 is shown. For task 221, a load unit sequence 224 of a plurality of load units 230, 231, and 232 is shown exemplarily; further load units within this sequence are not shown. For task 222, another load unit sequence 225 of another exemplary plurality of load units 233, 234, and 235 is shown. For task 236, a load unit sequence 240 of a plurality of load units 237, 238, and 239 is shown. As FIG. 3 illustrates, the number of load units within a load sequence can be different for every task and may vary widely. As illustrated in FIG. 3, the hardware side of the OTC manages also the load sequence of load units associated with a task. Although the complete load sequence of a task is illustrated to be managed by hardware, this does not refer to the OTC hardware side always reflecting a complete load sequence for any task currently being managed. In an exemplary embodiment, the hardware side may reflect a small subset of the load sequence at any time, which may be adjusted quickly as the execution progresses. The set and sequence of load units assigned to a task, earlier defined as the load sequence, may be communicated as metadata (data about data) within the task information or within metadata about the load units.

OTC hardware reflects specifically the tasks that are in runnable state. The highest priority task (e.g., task 210) is the one currently in the RUNNING state. Terminated (e.g., task 216) and waiting (e.g., tasks 212, 214, 215, and 218) tasks are not reflected in the OTC HW. Any task has assigned a load sequence that identifies the related load units in an order that provides a sequence for the load process.

Finally, the FIG. 3 illustrates the interaction between the software and the hardware. An OS scheduler performs its activities, e.g., as defined for the OS scheduler for the AUTOSAR OS. Other OS scheduler of other OS work similar and can be instrumented similarly. Whenever this OS scheduler detects a change in the task state of its N top priority runnable tasks, it provides the corresponding state change information to the hardware side. For this purpose, a software application programming interface (API), the OS API, is defined that is illustrated by the boundary 219. This API interacts with the hardware side via registers and interrupt processing. The number of tasks managed by the hardware side can be limited to only reflect the top priority N runnable tasks, e.g., the N=4 top priority runnable tasks, within the amount of tasks managed by the OS scheduler software. This can reduce the required hardware and minimize the amount of required interactions. Only task state changes affecting runnable tasks need to be reflected in hardware. As such OTC hardware reflects a plurality of (e.g., the top N priority) runnable tasks.

Figure 4:
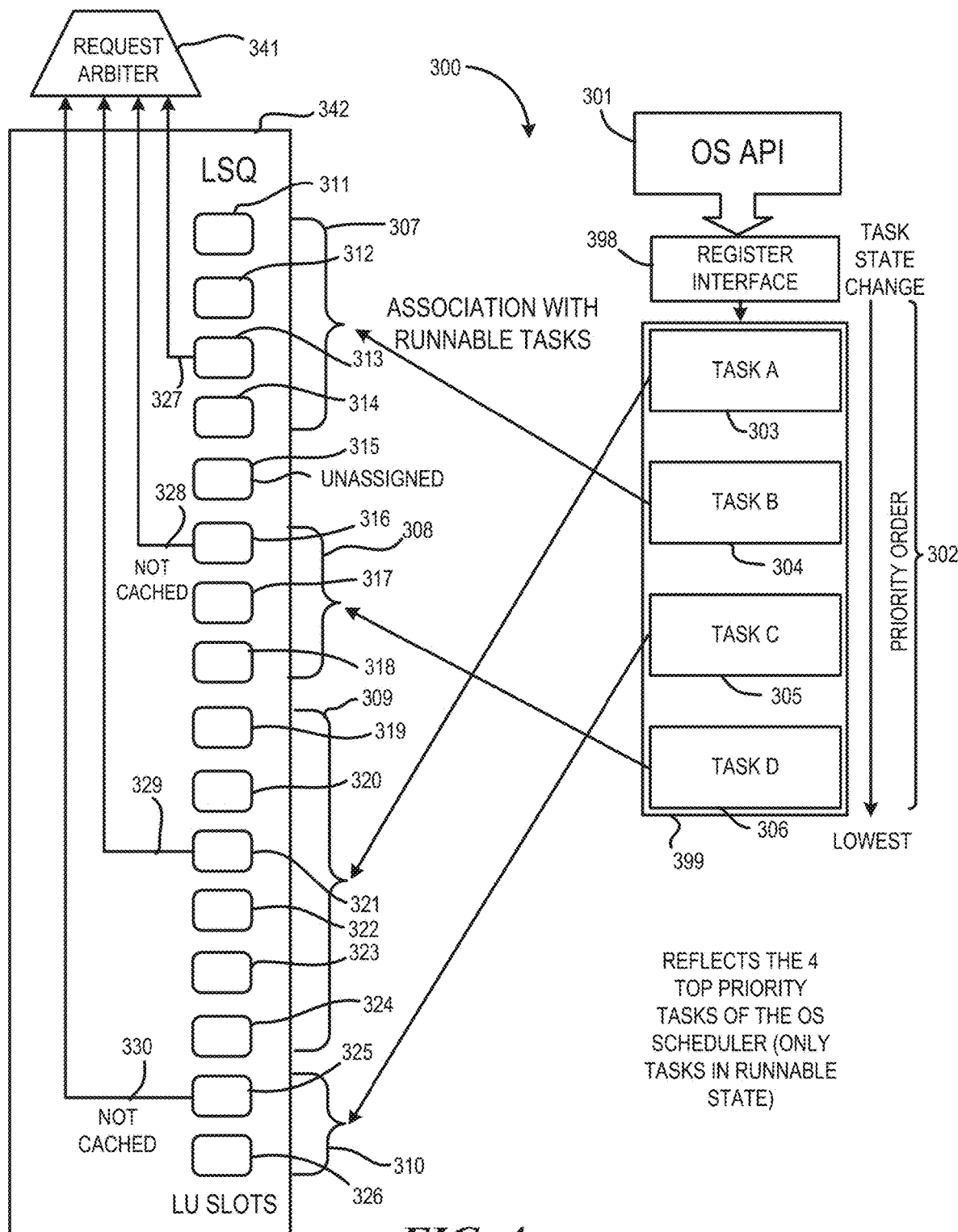
FIG. 4 is a block diagram illustrating elements of a scheduling structure in accordance with at least one embodiment.

FIG. 4 is a block diagram illustrating elements of a scheduling structure in accordance with at least one embodiment. This scheduling structure 300 comprises a load sequence queue (LSQ) 342 and a request arbiter 341; in addition, it permits to associate the elements of the LSQ with the set of tasks managed by the OTC hardware as illustrated by the FIG. 3. An operating system (OS) application programming interface (API) 301 manages task state changes of task A 303, task B 304, task C 305, and task D 306 via the register interface 398. Using read and write accesses to this register interface, corresponding changes of the task attributes are reflected in the task information container 399 recording associated information for a set of tasks managed by hardware. Associated information is recorded within this container, e.g., the load sequence and the task priority and further metadata about the task. As illustrated, priority order 302 arranges task A 303 as the highest priority task, task B 304 as a lower priority task, task C 305 as an even lower priority task, and task D 306 as the lowest of the N=4 top priority tasks. Related task properties and their relationship to other elements of the scheduling structure can be modified by adjusting the content of the task information container 399 or its associations.

The load sequence queue (LSQ) 342 provides a set of load unit slots 311-326, where every load unit slot is capable of holding and managing one load unit. Within load sequence queue 342, anticipation windows, such as anticipation windows 307, 308, 309, and 310 are defined and associated with one of the managed tasks. The definition of anticipation windows, the amount and set of included load unit slots, and their association with the set of managed tasks can be performed dynamically by the hardware managing the LSQ. In accordance with at least one embodiment, such relationships can be implemented, e.g., by any of the N task containers referring to the first element of its associated anticipation window via the index of its load unit slot (a number of 0-15 for a LSQ implementing M=16 slots). The load unit slots and their order assigned to such an anticipation window can be implemented, e.g., by another index that refers to the next slot within an anticipation window. Other implementations are also possible, e.g., a two-dimensional reference table utilizing the relative task priority (0 . . . 3) and the relative location within the anticipation window (M/2=0 . . . 7) to refer to one of the M=16 load unit slots addressed by it, or to identify an unavailable slot. Since those relationships can be stored in hardware registers, these aspects of the LSQ structure can change dynamically. The association shown in FIG. 4 provides exemplarily the corresponding assignment at one point in time. Anticipation window 307 includes load unit slots 311, 312, 313, and 314 pertaining to task B 304. Anticipation window 308 includes load unit slots 316, 317, and 318 pertaining to task D 306. Anticipation window 309 includes load unit slots 319, 320, 321, 322, 323, and 324. Anticipation window 310 includes load unit slots 325 and 326.

Portions of load sequence queue 342 can be connected to request arbiter 341, as will be described in greater detail further below. In accordance with at least one embodiment, this can be accomplished by selecting only a subset of the load unit slots, or by enabling only such a subset. As with the above-described selection of load unit slots, these selections can also be made or derived from hardware registers. For example, load unit slot 313 is connected to a first input of request arbiter 341 via interconnect 327, load unit slot 316 is connected to a second input of request arbiter 341 via interconnect 328, load unit slot 321 is connected to a third input of request arbiter 341 via interconnect 329, and load unit slot 325 is connected to a fourth input of request arbiter 341 via interconnect 330. Load sequence queue 342 can include load unit slots which are not assigned to any load units of any tasks and thus are not within an anticipation window. For example, load unit slot 315 is an unassigned load unit slot. Also, the above connections and assignments reflect the situation at one point in time and may change dynamically (e.g., by a complete connection matrix that permits a modifiable selection of a subset of its connections as described above). The load unit slots are used to record state information and metadata for a single load unit; e.g., a load unit identified by a load unit slot may be cached, while another load unit by another load unit slot may not be cached. For example, the load units of load unit slots 311, 313, and 314 of anticipation window 307 and the load unit of load unit slot 317 of anticipation window 308 may be cached, while the load unit of load unit slot 312 of anticipation window 307 and the load units of load unit slots 316 and 318 of anticipation window 308 may not be cached. Similar applies to the load units reflected by the load unit slots of the anticipation windows 309 and 310.

In a particular embodiment, where load sequence queue 342 includes M load unit slots, a maximum of M/2 load unit slots can be assigned to any particular task.

The load sequence queue (LSQ) 342 provides the management of anticipation load unit load requests for a subset of the currently runnable tasks. The load sequence queue 342 provides M slots for load unit (LU) instances, the load unit slots. The load sequence queue 342 manages load units belonging to the top N priority runnable tasks. Upon task activation, a number of LSQ load unit slots (e.g., load unit slots 311-314) are assigned to an activated task. In accordance with at least one embodiment, the maximum permitted number of slots per task is M/2. In accordance with at least one embodiment, the minimum number of slots per task is 1. In accordance with at least one embodiment, the total number of assigned slots does not exceed M. In accordance with at least one embodiment, unassigned slots are permitted. In accordance with at least one embodiment, the number of slots is not changed after assignment to a task, even in case of missing slots. The set of assigned slots (e.g., load unit slots 311-314) defines the anticipation window (e.g., anticipation window 307) for the associated task (e.g., task 304). OS API software manages task state changes including changes in priority. Accordingly, limited interaction with the OTC hardware is sufficient for controlling the anticipation. OTC hardware initializes the content of any LSQ LU slots associated with a task, as described below. The first load unit to be loaded is determined from the associated task information, either the load unit (LU) containing the address of an earlier pre-emption or containing the entry function. For each LU, basic load unit information can be determined by the OTC hardware. For each LU, its status is determined by a lookup operation (for example, a status lookup performed in a manner similar to the address lookup operation and which provides the status of a LU) and the associated LU status information is recorded. The remaining LU slots assigned to the associated task are filled with information for subsequent LU instances (e.g., by following the information defining the load sequence). For each task, the first LU slot containing a load unit that is not cached (already loaded) is selected and reported to the request arbiter. Reporting includes the position within the anticipation window.

Figure 5:
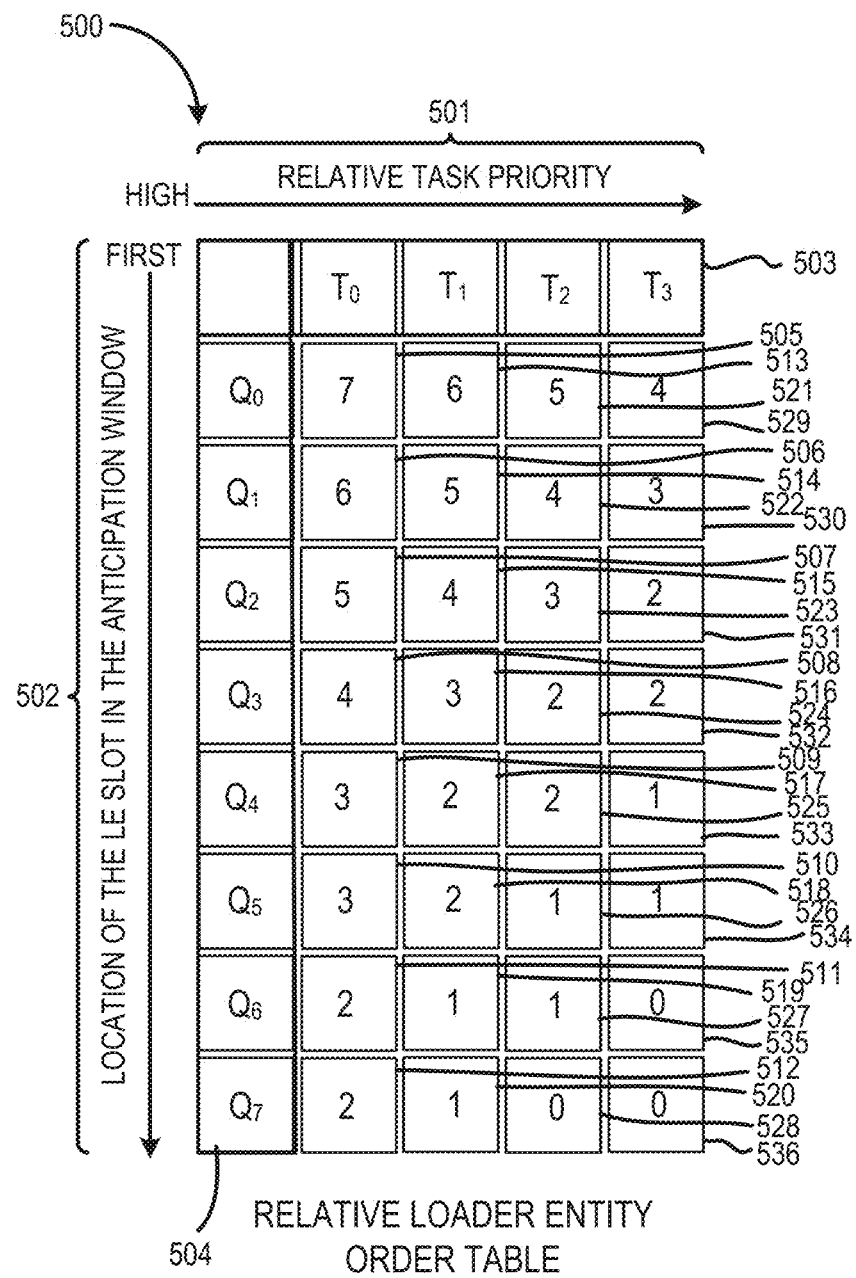
FIG. 5 is a tabular diagram illustrating a relative order table for an apparatus comprising a scheduling structure in accordance with at least one embodiment.

FIG. 5 is a tabular diagram illustrating a relative order table for an apparatus comprising a scheduling structure in accordance with at least one embodiment. Relative LE order table 500 comprises a plurality of entries 505-536 arranged by relative task priority T0, T1, T2, T3 along a horizontal axis 501 and relative location of the load unit slot Q0, Q1, Q2, . . . in the anticipation window along a vertical axis 502. In accordance with at least one embodiment, a plurality of relative task priorities along horizontal axis 501 include N entries, $T_0$, $T_1$, $T_2$, and $T_3$, as shown in row 503. In accordance with at least one embodiment, plurality of locations of the load unit slot in the anticipation window along vertical axis 502 include the maximum permitted entries, e.g., M/2 locations $Q_0$, $Q_1$, $Q_2$, $Q_3$, $Q_4$, $Q_5$, $Q_6$, and $Q_7$. The content of any entry within the relative order table may contain a hardcoded value or may be made programmable by software via the register interface 119. A combination of the relative task priority Ti and the location of the load unit slot in the anticipation window Qj is used to select one of these entries. The content of an entry in the relative order table can be used as issue weight to determine a request weight, which can be used for request arbitration by request arbiter 341. In the illustrated example, in the first column, entry 505 has an issue weight of 7, entry 506 has an issue weight of 6, entry 507 has an issue weight of 5, entry 508 has an issue weight of 4, entry 509 has an issue weight of 3, entry 510 has an issue weight of 3, entry 511 has an issue weight of 2, entry 512 has an issue weight of 2. In the second column, entry 513 has an issue weight of 6, entry 514 has an issue weight of 5, entry 515 has an issue weight of 4, entry 516 has an issue weight of 3, entry 517 has an issue weight of 2, entry 518 has an issue weight of 2, entry 519 has an issue weight of 1, entry 520 has an issue weight of 1. In the third column, entry 521 has an issue weight of 5, entry 522 has an issue weight of 4, entry 523 has an issue weight of 3, entry 524 has an issue weight of 2, entry 525 has an issue weight of 2, entry 526 has an issue weight of 1, entry 527 has an issue weight of 1, entry 528 has an issue weight of 0. In the fourth column, entry 529 has an issue weight of 4, entry 530 has an issue weight of 3, entry 531 has an issue weight of 2, entry 532 has an issue weight of 2, entry 533 has an issue weight of 1, entry 534 has an issue weight of 1, entry 535 has an issue weight of 0, and entry 536 has an issue weight of 0. The determined issue weight can be combined with other factors, e.g., the load unit size, to determine the arbitration criteria that are used by the request arbiter 341 for the arbitration.

Figure 8:
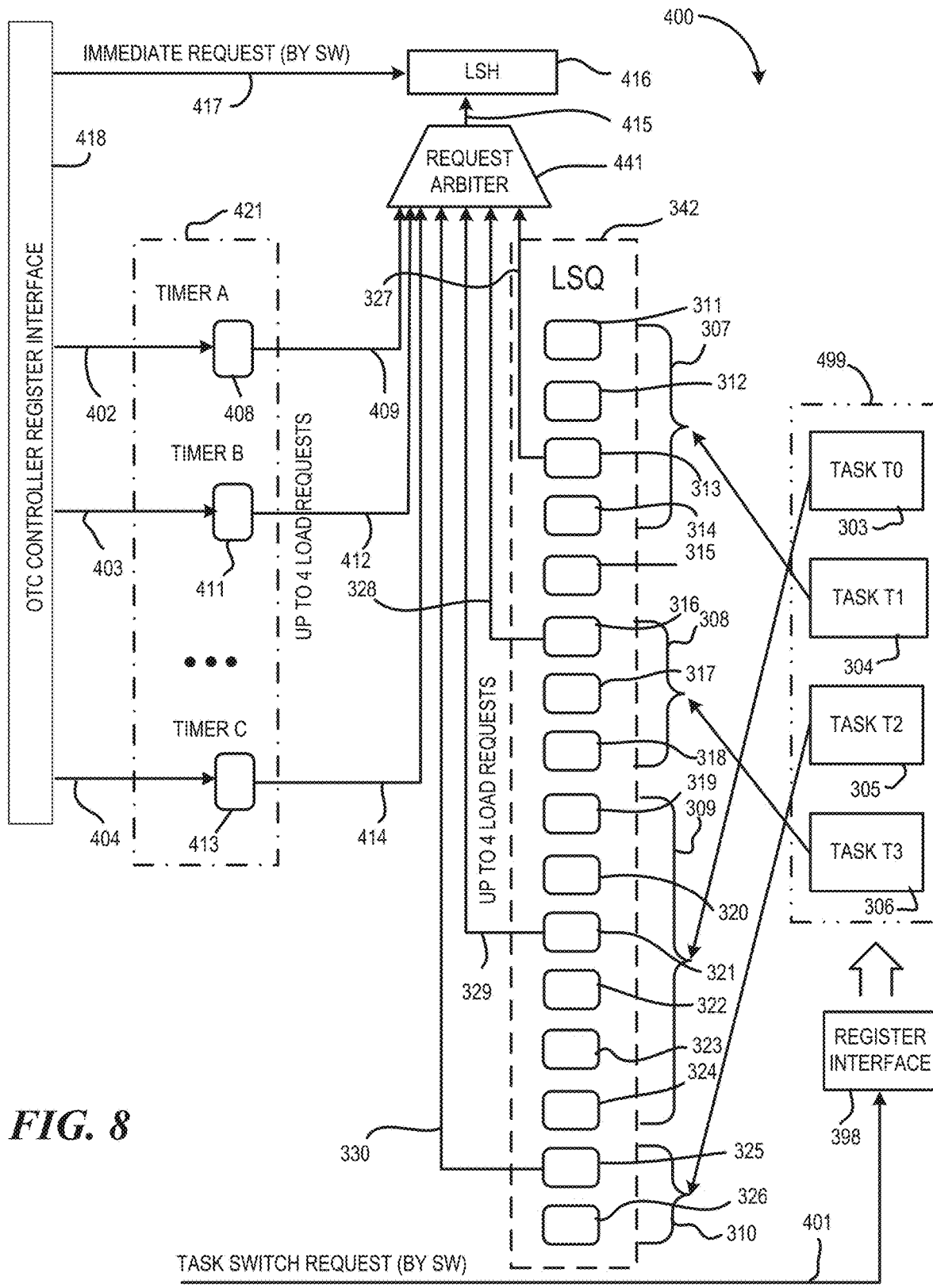
FIG. 8 is a block diagram illustrating the integration of an apparatus comprising a scheduling structure in accordance with at least one embodiment with further hardware elements implementing, performing or enabling other scheduling algorithms.

The above entries are used by the load sequence arbitration, which identifies the relative order for each LU to be utilized for the calculation of the arbitration criteria that are presented to the request arbiter for anticipation processing. Load sequence arbitration is applicable to at least priority-based load requests, and provides further criteria for the anticipation requests from the N top priority tasks. Although the currently running task T0 shall usually receive the highest priority for a load anticipation of load units, there must also be some appropriate priority for the load anticipation of load units for lower priority tasks. Focusing only on the currently running task would result in an issue when this task is terminated, has to wait for some resource, or is otherwise stalled. Then the next priority runnable task becomes the running task, and its load units shall therefore also receive an appropriate priority for load anticipation. Equivalent argumentation holds for tasks having even a lower priority. The relative order table defines the corresponding relationship, optionally programmable, in giving, e.g., the first slot Q0 of the second highest priority task T2 a higher LE order (5) than the fourth slot Q3 of the currently running task T0 (4), as this is shown in the example of FIG. 8.

The arbitration criteria used by the request arbiter 341 may take into account further information besides the relative order, e.g., task related information (e.g., priority, state, or an activation factor related to task activation/deactivation, which may be provided by SW), or load unit related information (e.g., size, a criticality property, or load urgency property). Any of these values may be included in the calculation to determine the selection criteria used.

The combination of the load sequence for a task, the portion of this load sequence that is identified and managed by the anticipation window of a task, and the relative order determined from the relative order table 500 in combination with other data used for the calculation of the arbitration criteria provides a flexible mechanism to change the abstraction level for managing the anticipation of load units assigned to a load sequence of a multiplicity of tasks.

Figure 6:
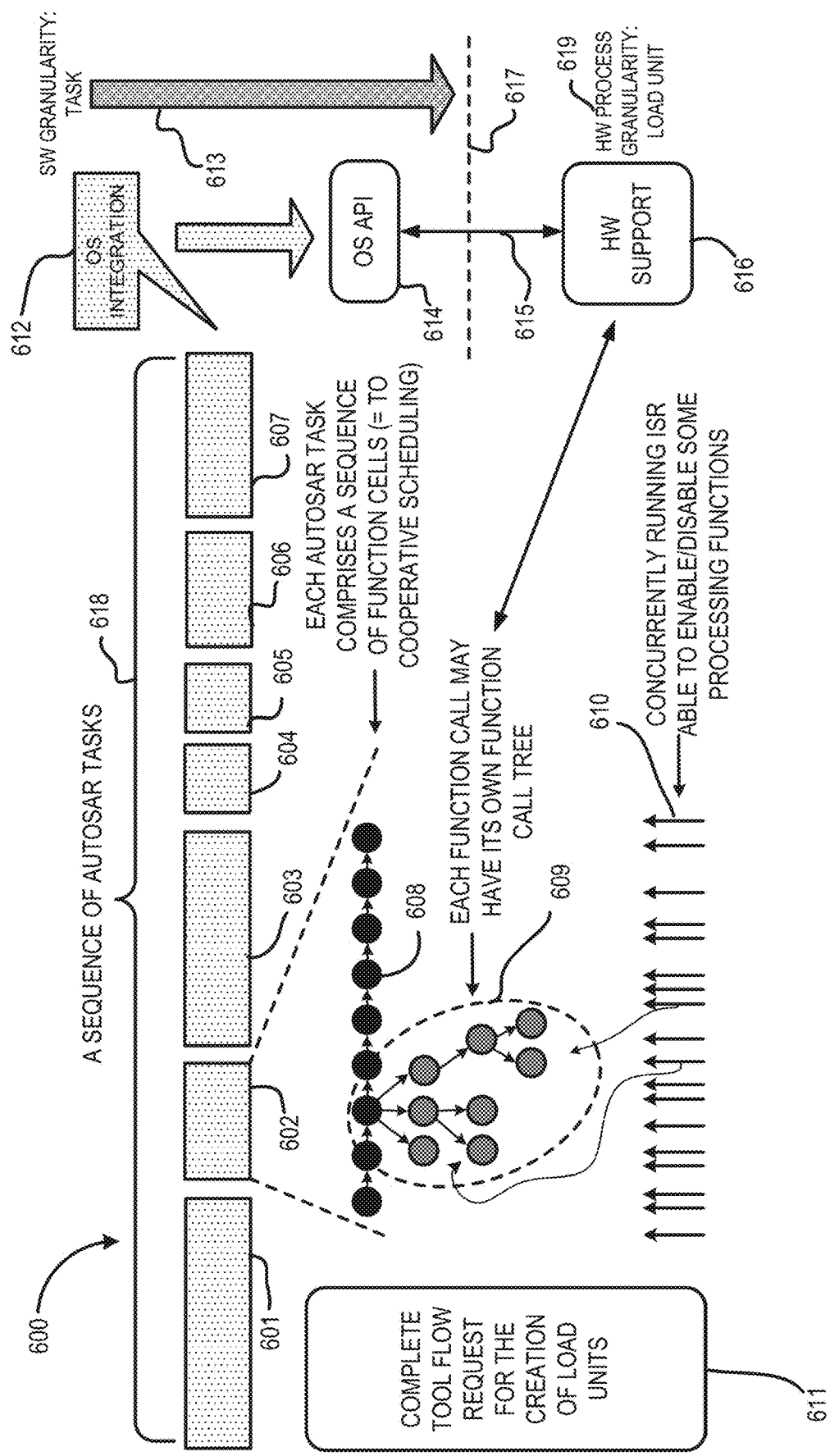
FIG. 6 is a diagram illustrating a process for the usage of an apparatus comprising a scheduling structure in accordance with at least one embodiment, in combination with supporting infrastructure and the handling of specific abstraction levels by this combination of specialized hardware and software.

FIG. 6 is illustrating a process for the usage of an apparatus comprising a scheduling structure in accordance with at least one embodiment, in combination with supporting infrastructure, namely the API for integrating this apparatus into an OS scheduler (OS API 614) and the tool flow 611 used for identifying and generating the load units from an already compiled application. FIG. 6 provides an overview of the corresponding interactions, the associated complexity, and some background about the change in abstraction level that is performed by the usage of load sequences by the LSQ. As such, the load sequence is an example for an order criterion that may be defined for an observation unit and then utilized to specify a corresponding anticipation operation. Other embodiments may utilize some different order criterion or criteria for a different anticipation operation. FIG. 6 shows a sequence of task executions 618, in this example comprising of the tasks 601, 602, 603, 604, 604, 606, and 607. For simplicity, it shows every task executed only once; in a real-world execution, there will be a more complex execution sequence, where higher priority tasks pre-empt lower priority ones. Also, tasks may have to wait for a resource, or a task is started or terminated by an OS scheduler (not shown). Usually the selection and execution of tasks is controlled by an OS scheduler; in this example, a real-time OS (RTOS) that is widely used in the automotive industry (AUTOSAR) is referenced.

In general, each task comprises a top-level function, which may itself call a sequence of functions; these calls may be arbitrarily complex, e.g., involving iterations, conditional calls or any other complex interactions that can be represented by modern programming languages. For simplicity reasons, we show in this example only a simple sequence of function calls for one task, like the task 602, which comprises of a sequence of function calls 608. Each cell in this sequence is representing a function call that can itself have its own function call tree of arbitrary depth. For example, the third function call cell in the sequence 608 is shown as having its own exemplary function call tree 609. Extremely simplified, this function call tree may be used to depict the static aspects of a corresponding code execution, and the associated complexity. The depiction of the static aspects, as illustrated, can be understood to extend to the dynamic aspects of code execution for a task and its associated function call tree (not shown). A further complexity that is also of dynamic nature is that an interrupt service routing (ISR) providing execution at one of the time events 610 can change some internal state within the application. Similar behaviour may be observed to occur during the execution of other function calls, which may also provide a flag or further data to be processed when pre-empting a lower priority task, an aspect that is also not shown in this FIG. 6, as already indicated above. Any such event may initiate or suppress the execution of a function call and its associated function call tree at any level of this tree. For example, at one of the indicated times 610, an ISR can cause an application state change that later causes the execution of some function calls of function call tree 609.

Often the set of available tasks, such as the AUTOSAR tasks 601-607, may be too coarsely grained (too big in size, or having too much variation in size) to efficiently serve as observation or load units. In many cases switching between many, more fine-grained tasks at an OS level could result in excessive overhead, which is in many cases avoided when the task structure on a real-time OS is being defined. In other scenarios, it may be desirable to break the code associated with a task into smaller pieces; e.g., to have a more granular measurement for profiling purposes or a more detailed resource utilization (which can avoid a needless blockage of other tasks that require the same resource). Another potential is a finer granularity of protection mechanisms (e.g., along interfaces or an AUTOSAR microcontroller abstraction layer (MCAL) boundary, which can also be utilized by some hardware virtualization functionality). Accordingly, an application code structure like the one described above may be exploited to identify a finer grained structure along the function call sequence 608 and the corresponding function call tree 609. A split of a task into one or more observation or load units preserves the integrity of the functions as atomic elements, but otherwise assigns one or more of these functions to a single load unit that is associated with one of the tasks 601-607. This split of a task into multiple load units provides load units which are derived from and are smaller than tasks. Smaller load units resulting from such a split of a task into a set of load units can be exploited to enable sufficient load granularity, less variation in load time, quicker reaction, better, more accurate predictions of processing scheduling, or any combination thereof. In addition, a tool or tool flow 611 can be utilized to define and generate (and maintain) the load sequence described earlier. As described earlier, the load sequence is an example for an order criterion defined for an observation or load unit.

The above complexity of an application execution in the context of a real-time OS is exploited by the method for scheduling in accordance with at least one embodiment, which is described in the column at the right side of FIG. 6. Absent the inventive subject matter presented herein, the granularity of OS tasks is not sufficient for an effective anticipation operation, but a finer granularity cannot be achieved when this is only controlled by an OS scheduler. At a broad level, the conceptual solution for this problem is illustrated in the right column of FIG. 6.

A small interface layer, the OS API 614 is responsible for interacting with the OTC subsystem hardware via its register interface. This interface layer is integrated into the OS scheduler of a real-time OS via a specific OS integration 612. The application itself need not be modified and is therefore not affected. This interaction permits to exploit knowledge existing within the OS to control any load anticipation at the granularity known by the OS, which is a single OS task (which is depicted as the SW granularity 613).

The OS API interface layer 614 interacts with supporting hardware 616, which implements an apparatus comprising an OTC subsystem for scheduling of operations in accordance with at least one embodiment. The corresponding interactions are mostly based on a register interface 615 as described earlier within FIG. 4; further aspects of hardware/software interaction may be covered by interrupts. This supporting hardware has at least two uses. Firstly, it observes the execution of the application software along observation or load unit boundaries, and adjusts the anticipation windows and their content accordingly. Secondly, it controls the anticipation of observation or load units. Related aspects have been described in detail in earlier figures and may be further combined with the support of further anticipation algorithms as described below with respect to FIG. 8.

As such, there is a natural boundary between the hardware layer 616, which can act in most aspects based on the finer granularity of observation or load units, and the software layer comprising the OS integration 612 and the OS API 614. The application software itself is not affected; the definition of observation or load units within metadata is sufficient, which does not alter the object code; it only adds structure to it. This avoids undesirable constraints or modifications of the application software. In contrast to the hardware layer, the OS based software layer implemented by the OS API can act on a coarser task granularity. This difference in processing granularity exhibits the implied change in abstraction level from a task granularity utilized by the software layer (613) to the observation or load unit granularity 619 exploited by hardware which is depicted as the boundary 617 in FIG. 6.

Figure 7:
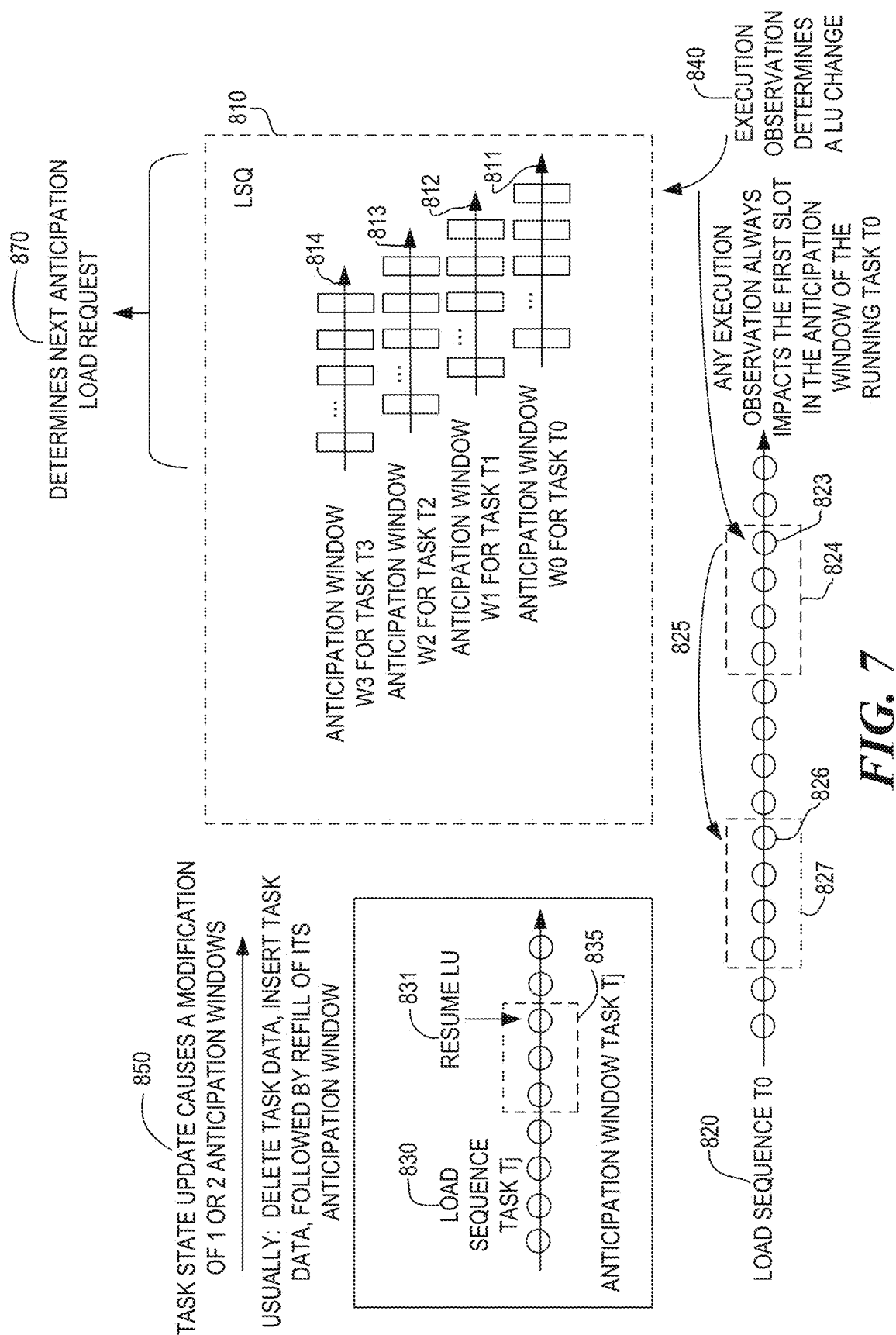
FIG. 7 is a conceptual block diagram illustrating the dynamic operation of a method and apparatus for the scheduling of operations to be performed within an information processing system in accordance with at least one embodiment.

FIG. 7 is a block diagram illustrating the usage and behavior of a conceptual LSQ 810 (where the implementation aspects are shown in FIG. 4 as LSQ 342) to implement a scheduling structure in accordance with at least one embodiment. FIG. 7 illustrates the conceptual aspects of the LSQ, an anticipation window, and its relation to a load sequence of observation or load units (as an example for an order criterion) for a task. For the sake of simplicity, the further description only refers to load units instead of referencing also the observation aspect, which, in accordance with at least one embodiment, can be practiced instead of or in addition to the load unit aspect. FIG. 7 provides an abstraction to supplement the implementation details shown in and described with respect to FIG. 4. For the purposes of this disclosure, a set of load units and a load sequence (or another order criterion) is understood to have been created by a mechanism, such as a tool or tool flow, and provided to the apparatus described herein for observation and anticipation scheduling. Thus, a defined sequence of load units to be loaded is obtained and can be scheduled appropriately, as described herein.

Conceptually, the LSQ implements a structure that provides an anticipation window for each of the N top priority tasks that are registered by this queue; in the example of FIG. 7 there are N=4 tasks T0-T3, and N=4 corresponding anticipation windows 811-814. The task T0 represents the highest priority task, which is the one in running state. The description of FIG. 4 provides further details on an implementation in accordance with at least one embodiment that supports each anticipation window Wi to comprise an exemplary specific number of Li anticipation slots. An anticipation slot corresponds to a load unit slot assigned to an anticipation window. In accordance with at least one embodiment, the number Li may change whenever the task assigned to the corresponding anticipation window Wi changes. At any time, an anticipation window Wi occupies Li slots, where the value of Li is between one and M/2 of the M=16 load unit slots implemented within the LSQ for this embodiment. The described sum of all Li may not exceed M, which is ensured by the assignment algorithm, as there are only M slots available in hardware.

Conceptually, a first set of modifications of the information processed within the scheduling structure implemented by the LSQ 810 in accordance with at least one embodiment is requested in form of a task state update request 850 provided by the OS API via the OTC controller register interface 398, as this is shown in FIG. 4. In accordance with at least one embodiment, a task state update request 850 comprises a combination of one or both of the following two optional operations: (a) delete the information associated with the task Ti, where Ti is one of the N=4 top priority tasks currently being registered within the LSQ structure, followed by (b) insert the information associated with task Tj, where Tj is a task not yet recorded within the LSQ structure as the new P priority task, where P is one of 0 to N−1. Any of both operations is optional, enabling the insertion of a task by registering this task within an empty task structure, or removing a task from the LSQ resulting in an empty task structure. The task Tj may also be the new task Ti when the new priority P is not equal to i (otherwise it would replace itself); such an operation is equal to a change in priority of the task Ti to a new priority P. In the accordance with at least one embodiment, the priorities of other registered tasks are adjusted accordingly; e.g., the deletion of the task T1 leaves the higher priority task T0 intact, but adjusts the earlier task T2 to become the new task T1; the next priority task T3 becomes the new task T2. Similarly, the insertion of a new task Tj into, e.g., the position P=1, will make the earlier task T1 the new task T2, and the earlier task T2 becomes the new task T3. In accordance with at least one embodiment, the register interface ensures that in case the LSQ is full (contains task information for N=4 tasks) there is a valid delete operation before a valid insert operation, thus ensuring there is an empty structure for receiving the information for the new task Tj.

After registering a task state update request 850 and registering its association with one of the tasks within the task information container 399, e.g., the task C, the hardware managing the LSQ determines the resume load unit (LU) information 831 from the task information associated with this task. The content of the task information container 399 may be managed concurrently or independently from the LSQ; the only prerequisite for the LSQ is that the corresponding task is registered and the required information is made available in the task information container 399. The resume LU information 831 identifies the LU that contains the address location that will be used when the execution of a task Tj is resumed; this information is determined upon a task switch (e.g., when pre-empting the task execution or when terminating a task) and recorded within the task information for the task Tj. Initially, the resume LU within the task information is set to the LU containing the entry function of the task Tj. In any case, the resume LE information 831 is then used as the starting point for an "anticipation window fill" operation performed by the hardware managing the LSQ 810. For the purpose of observing a task execution, the entering of a new task in the anticipation window as described above causes an observation leave operation related to the earlier observation unit and an enter operation related to the observation unit that corresponds to the starting point of the anticipation window.

An anticipation window fill operation fills any Li slot of an anticipation window Wi with metainformation about a LU, starting with the provided starting point. Accordingly, an anticipation window fill operation exploits the load sequence information 830 for the new task Tj determined earlier, e.g., by an external tool flow. In accordance with at least one embodiment, the information about the load sequence is provided in form of a "next" pointer within the metainformation about a LU. By following this next pointer within the metainformation for any included LU, the load sequence of a task can be determined easily. Similarly, any subset of this load sequence can be processed in the same way, as long as a LU as starting point is provided. Similar behaviour can be achieved for observation purposes by utilizing another order criterion provided within the metadata of a LU. It is also possible to specify a further LU specific anticipation criterion in addition to the load sequence, which permits the execution of a LU specific anticipation operation in combination with a load anticipation operation. In such a scenario, the load sequence specifies the fill order for an anticipation window, while the order criterion specifies the related LU selected for an anticipation operation.

In accordance with at least one embodiment, filling an anticipation window is a repetitive operation where every step is executed Li times, one time per slot within the anticipation window Wi. These operation steps start with the starting point, which is provided by the operation requesting the anticipation window fill. After filling one slot with metainformation about a LU, the hardware managing the LSQ identifies the next LU by querying the metadata of the earlier LU recently put in this slot. The fill operation is then repeated for every slot within the anticipation window Wi. Accordingly, the metainformation for all LU may be provided in form of a table within the internal memory. By reading this metadata, all information sufficient for filling a LSQ slot can be determined. In accordance with at least one embodiment, this metadata contains the information about the next LU within the load sequence 830 for a task. By the above sequence of processing steps, every slot of an anticipation window Wi is filled with the metainformation for a LU. This processing is repeated until i) either all slots of the anticipation window are filled or ii) the load sequence queue is completely processed. Thus, an anticipation window fill operation ensures that all slots of an anticipation window represent the metadata for the next Li entries within the load sequence for the corresponding task, starting with the LU holding the resume address. This scenario is depicted by the anticipation window 835 in relation to the load sequence 830. Using the anticipation window fill operation, all anticipation windows Wi within the LSQ can be filled by hardware under software control, e.g., the anticipation windows 811-814 shown in FIG. 7.

A second set of modifications of the information processed within the scheduling structure implemented by the LSQ 810 in accordance with at least one embodiment is requested conceptually in form of an execution observation event 840. This may be provided by one of the observers 161, 162 through 169 via the feedback paths 181, 182 through 189 to the controller 118, as this is shown in FIG. 1. Since this controller 118 comprises, besides other elements (not shown), the one or multiple instances of the internal logic 99, the scheduling structure within these elements is capable of receiving related notifications accordingly. In accordance with at least one embodiment, some of such notifications may identify a switch from one LU, the current LU, to another LU, the target LU. Any of the involved LUs can only belong to the currently active READY (=RUNNING) task T0, and are, as such, an element within the load sequence 820 defined for this task. Any such notification may result in zero, one or two observation events (not shown), first an (optional) leave observation event associated with the current LU (which is the one leaving the current LU slot), which is followed by an (optional) enter observation event associated with the target LU (which is the one entering the current LU slot). In addition, an anticipation event associated with the current or next LU (or both) may be triggered. Utilizing these events permits an observation of the application execution at the granularity specified by the LUs in the background without software involvement, and an optional anticipation operation that can be defined by the metadata.

Conceptually, any execution observation event 840 causes an anticipation window fill of the anticipation window associated with the currently running task T0 (811), which is configured to manage the portion of the load sequence reflected by this anticipation window along the execution progress for this task. When receiving the execution observation event 840, in accordance with at least one embodiment, it is assumed that the content of the anticipation window 811 reflects the portion of the load sequence 820 depicted by the frame 824. The first slot in the anticipation window corresponds to the first element 823 within this frame, which is the current LU. Upon receiving the execution observation 840, the hardware managing the LSQ determines the LU that corresponds to the next LU reported by this event, the target LU 825. In accordance with at least one embodiment, this is done by querying the LU information against the address provided by the execution observation event 840. This LU is then set as the new starting point 826 for an anticipation window fill operation. This fill operation is then performed as already described above. When the anticipation window fill operation is finished, the content of the anticipation window for task T0 811 reflects a new frame 827 of the load sequence for the running task 820, which starts at the new LU 826 as determined by the query operation 825.

In accordance with at least one embodiment, a third processing step is continuously and concurrently performed by the hardware managing the LSQ for any of the anticipation windows 811-814; it is the anticipation window load request. The load request can be considered an output of the anticipation scheduling apparatus, as it effects the scheduling being performed. The basic implementation of this processing step has already been described in the FIG. 4 for at least one embodiment. In another embodiment, this step may be triggered by any of the above operations or by an internal state change. This processing step determines the next anticipation load request 870 for any anticipation window. In addition, the selection of the actual load request from this set of anticipation load requests, is described in FIG. 4 and FIG. 8 for cases where further anticipation algorithms are used.

Conceptually, this process step queries any slot within an anticipation window, starting with the first slot of this window. For any slot, the process determines the state of the load unit recorded within this slot, which may, in case of at least one embodiment, be either cached (already loaded), uncached (not loaded), or currently being loaded (inflight). In the preferred embodiment, the later state (inflight) is treated equivalent to an already loaded LU, to avoid iterative requests. The first slot identified to represent a LU that is not cached is selected to provide the information for the next anticipation load request by the corresponding anticipation window. The anticipation window fill operation may be combined with the anticipation window load request operation, or both operations may be executed independently. It is also possible to trigger an anticipation load request in case of changes to the content to the anticipation window, or internal state changes of its content, e.g., when a LU changes its state, not in response to other circumstances. One example for such an internal state change is finishing the loading of an LU, which may then select the next LU in the load sequence.

FIG. 8 is a block diagram illustrating the integration of an apparatus comprising a scheduling structure in accordance with at least one embodiment with further hardware elements implementing or performing other scheduling algorithms. The integration shown in FIG. 8 discloses exemplarily two further algorithms. Firstly, a software based anticipation algorithm is shown, where software determines the next load unit to be anticipated and performs an immediate anticipation request. Secondly, one or more anticipation requests based on some elapsed time are shown (e.g., for supporting a time-slicing scheduling or alarm condition, and further generalized as time-triggered) that may be generated by one or multiple timer instances, where every timer instance can provide one or multiple requests. In this context, the term anticipation refers to a request for loading a load unit in advance of its usage by software based on information available within the OS and the supporting hardware, in particular the OTC controller 118.

Accordingly, FIG. 8 illustrates an extension of the scheduling structure 300 depicted in FIG. 4 with further elements in accordance with at least one embodiment. FIG. 8 shows the scheduling structure can be augmented easily to support further anticipation requests. The resulting extended scheduling structure 400 comprises an extended request arbiter 441, which resembles the request arbiter 341 but provides further inputs for the arbitration process. The extended scheduling structure 400 further comprises a LSQ 342 and a task container element 499, which may be equivalent to the task container element 399 or an extended version of the task container element 399 to hold more task elements that may be needed to support the further anticipation algorithms. Similar to the exemplary embodiment described in FIG. 4, software manages changes in the task information and task state changes (e.g., a task switch request 401) via a register interface 398.

The extended scheduling structure 400 further comprises a capability to perform an immediate anticipation request under complete software control, which provides a very flexible capability for software to determine the next load unit to be anticipated. Such an anticipation request by software shall have higher priority and supersede any other anticipation request. In accordance with at least one embodiment, a container element Load Sequence Head (LSH) 416 is added to the output of the request arbiter 441 or 341. LSH 416 is capable of capturing the currently selected anticipation request selected by this request arbiter. LSH 416 may be further utilized to perform an immediate anticipation request, which overrides any internal anticipation request determined by a request arbiter 441 or 341. In accordance with an exemplary embodiment, an immediate anticipation request can be implemented by an extension of the OTC controller register interface 418 that is capable of directly altering the content of the LSH 416, e.g., via writing or overwriting the content of LSH 416. Thus, the content of LSH 416 can be used to pre-empt the output of the request arbiter 441 or 341 to preferably handle the immediate request received from the register interface via an immediate request 417, allowing such an immediate request to take precedence over other requests. In an exemplary embodiment, the content of the LSH 416 is then used by the anticipation hardware as the input for providing the load anticipation requests, e.g., as the element providing those requests for one internal structure 99. In an exemplary embodiment comprising multiple internal structures 99, as is illustrated in FIG. 2, the next to be processed request can be selected from the one or more of those requests 117 by a further arbiter, the transaction arbiter 115.

Another possibility to extend the scheduling structure 300 in accordance with an exemplary embodiment is also illustrated in FIG. 4, which utilizes an extended request arbiter 441 supporting a larger amount of load requests, e.g., further load requests 409, 412, . . . , 414. These requests may be provided by a further set of timer instances 408, 411, 413, which are programmed by a further extension of the OTC controller register interface 418 utilized to implement read or write accesses 402, 403, 404 to those timer instances. These timer elements are summarized as timer elements 421, which may be programmed by software via respective control registers within register interface extension 418. Each of the timer elements may—upon expiration or any similar event that may be programmed within a timer instance—provide an anticipation load request 409, 412, . . . , 414 to the extended request arbiter 441. These anticipation load requests can be combined with the anticipation load requests 327, . . . , 330 provided by the LSQ 342. The extended request arbiter 441 is then capable of selecting between the anticipation requests provided by the LSQ 341 and the further sources of such request, as exemplarily provided by the request timer elements 421. Accordingly, an extended form of the task information container 499 may be utilized to provide further information, which can also be referenced by the request timer elements 421, if such a feature is desired.

The scheduling structure illustrated in FIG. 8 in accordance with at least one embodiment employs three potential sources for an anticipation request (an immediate request by SW, a request timer, LSQ), having differing priorities and the capability to supersede a request by another. Thus, the scheduling structure of FIG. 8 provides an exemplary implementation of combining priority-based anticipation requests pertaining the N top priority runnable tasks (providing up to N load requests, one per anticipation window) with other sources for requests. Such a structure is also capable of balancing an anticipation request for not yet runnable tasks (e.g., provided by a request timer upon programming an AUTOSAR OS alarm) with the task priorities of runnable tasks provided by the LSQ. This enables requests that identify potential usage in the future (in the form of time-triggered requests supported by the request timers) with a corresponding change in abstraction level that is supported by the LSQ. Such a solution can be used to overcome many problems related to loading instructions, data, or both under software control. By supporting OS interaction, support is provided, for example, for implementations where an OS interaction is provided as the primary, or only, available interface between the application software and the underlying hardware without diminishing application performance. Both the varying sizes of tasks and the scheduling complexity of existing OS implementations are accommodated. Additional modification of the application software can be avoided.

Figure 9:
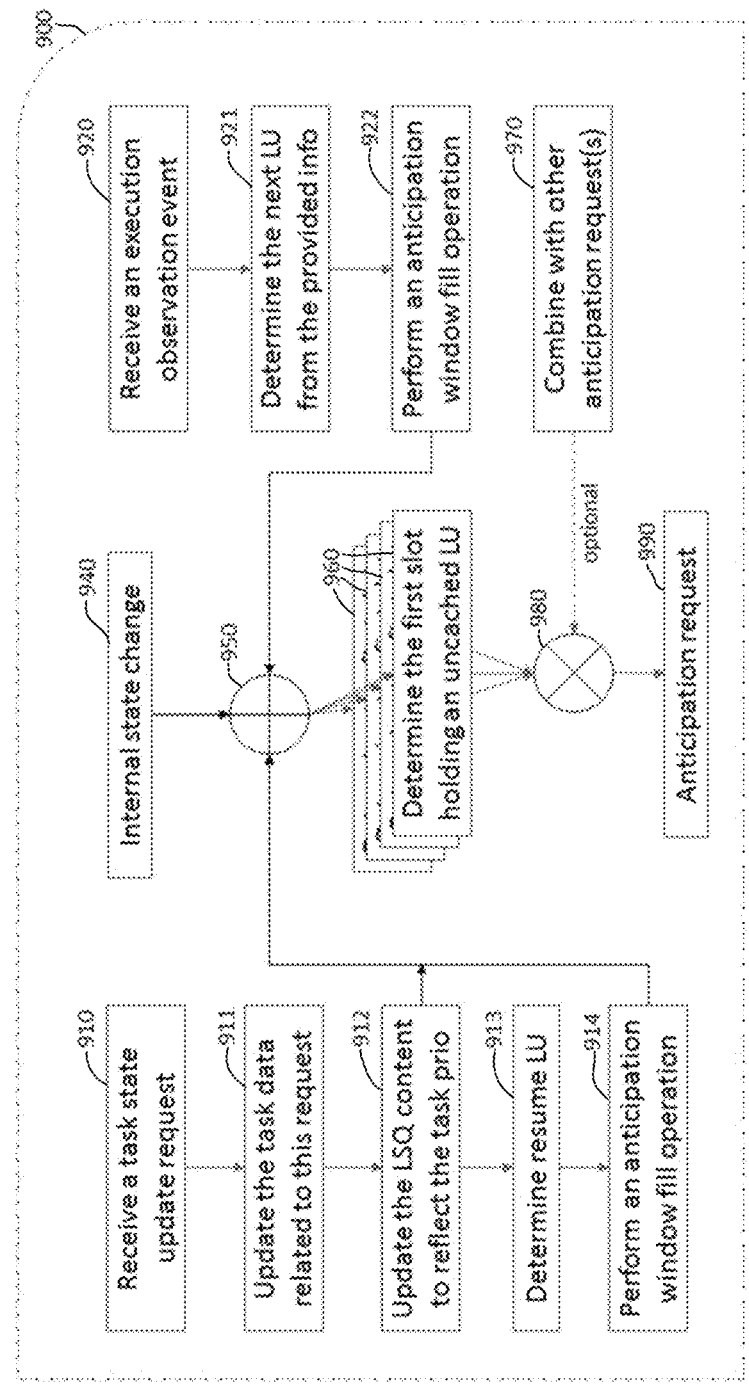
FIG. 9 is a flow diagram illustrating a method in accordance with at least one embodiment.

FIG. 9 is a flow diagram illustrating a method for load anticipation scheduling in accordance with at least one embodiment. Typical for a hardware implementation, there are multiple concurrent operations possible. These are depicted in separate columns.

As shown by the column at the left of FIG. 9, the first concurrent operation begins at block 910, which is triggered by receiving a task state update request, e.g., by a register operation that provides the corresponding information from an OS scheduler that identified a change in the state of a relevant task or a change in the priority of such a task. A relevant task in this context is one of the N top priority tasks. Such a task state update request relates to a conceptual task state update 850 in FIG. 7. Upon receiving a task state update request, the corresponding task data is updated accordingly in a second block 911, which may involve the removal of a task from the N top priority tasks, an addition of a task to the N top priority tasks, and also changes in the priority orders of all affected tasks. In a third block 912, the content of the LSQ is updated accordingly to reflect the updates in the task data, including any priority modifications. Any priority modification may conceptually cause a reassignment of an anticipation window to become the anticipation window of another task; e.g., upon deleting the task entry T2, the anticipation window of the earlier task T3 becomes the anticipation window of the task T2 (which is actually the same task, but this task has now a higher relative priority). When the task state update request causes merely a change in priorities, this execution thread can be terminated after block 912. Any such operation may also cause a new task to be added to the LSQ content, e.g., when inserting a new task or when a new task is added after deleting another one. For this case, the resume LU will be determined in a block 913. The final step of this operation thread is then shown by an anticipation window fill operation block 914 starting with this resume LU.

As shown by the column at the right of FIG. 9, the second concurrent operation is triggered upon receiving an execution observation event block 920, e.g., from an observer that has identified a switch between two LUs. Such an operation relates to the conceptual execution observation 840 illustrated in FIG. 7. Any such notification can only affect the currently running task T0, since this is the only task currently being executed. Upon receiving this event, a subsequent operation block 921 determines the target LU from the provided information, e.g., from the address that did hit another LU. The final step of this operation thread is then an anticipation window fill operation block 922 starting with this target LU.

As shown by the column in the middle of FIG. 9, the third concurrent operation may be triggered by any of the previous two concurrent operations of blocks 910-914, and blocks 920-922. It may also be triggered by an internal state change denoted by internal state change block 940 of an element within the internal logic 99 or the LSQ (e.g., the state of a LU, or other notifications generated internally) as shown by the OR node 950, or simply be performed continuously (not shown). A processing block 960 is performed repeatedly or concurrently for every anticipation window Wi reflected within the LSQ; the purpose of the processing of processing block 960 is to determine the next anticipation load request for the corresponding anticipation window. This is done by determining the first slot within such an anticipation window that holds an uncached LU in one or more blocks 960. Such processing block 960 relates conceptually to the anticipation load request operation 870 for a single anticipation window 811-814 illustrated in FIG. 7.

The sum of requests provided by the processing blocks 960 is combined in a further processing block 980 to identify the selected next anticipation load request for this LSQ. Optionally the processing block 980 may also include other anticipation requests provided by other scheduling mechanisms than the LSQ, as denoted by block 970. This selection usually utilizes some arbitration scheme based or including relevant information as described in FIG. 4 or 8. The processing of block 990 then determines the final anticipation request that is provided for one processing element (e.g., one of the bus masters 151-159) by the corresponding internal control logic 99.

Since there may be multiple processing elements, and multiple internal control logic elements 99, the corresponding processing method 900 may be replicated multiple times, and the one or more anticipation requests provided by all instances may be used in a further arbitration step (not shown) to determine a final anticipation request. A corresponding implementation of an arbitration for one or more elements 99 may be implemented by an arbiter element, e.g., the transaction arbiter 115 shown for the exemplary embodiment in FIG. 2.

Operating-system-aware task caching (OTC) enables the usage of an external (to the processor semiconductor die) non-volatile memory (NVM) (e.g., memory 110) within a system-in-a-package (SIP) or externally to such a package that provides to software a larger address range that can be buffered within the internal memory (e.g., internal memory 120). A partial buffering involves an in-advance loading of the instructions to be executed to ensure their availability in time, an important difference from traditional caches that perform an on-demand loading. Accordingly, OTC utilizes information available within the (one or multiple) operating system(s) that may be running on the multiple processor cores of a corresponding device. This anticipation mechanism is combined with a cache-like usage of the available buffer memory.

In contrast to traditional caches, the OTC performs a caching mechanism utilizing a large buffer memory on the basis of variable sized load units to not impose additional restrictions on a software application managed. OTC permits to define load units based on a collection of functions sets, which can be related to the structure of the application code. It also permits a better balancing of the load operations, since it permits to impose size limitations resulting in a minimum (which can be beneficial for the achievable bandwidth due to the overhead associated with a single access) and maximum load size (which can be beneficial for ensuring real time operation within an OS).

The dependency of the OTC on OS integration imposes new challenges. A first challenge is that the related interactions should reflect the OS scheduling mechanisms in the OTC hardware to avoid a significant impact on the application software. The related issue is that there is not a single mechanism, but several scheduling algorithms that may be combined or limited in specific aspects. The intent to support different (real-time) OS styles is not permitting limitations of this aspect. As such an appropriate support for integrating multiple scheduling mechanisms is provided.

The second challenge is caused by the insufficient granularity that is provided by the usual size of an OS task for balancing the associated load operations, which was overcome by splitting an OS task into multiple load units. However this split is not reflected within the OS integration, since finer granularity could impact the application itself. Instead some related hardware support is provided that is capable of further supporting the related aspects of hardware/software interactions for a load balancing with a finer granularity than an OS task.

At least one embodiment provides operating-system-aware task caching (OTC). OTC utilizes an internal memory (e.g., internal memory 120) acting as cache with a mechanism to perform load anticipation. OTC can enable the execution of an application program from an internal memory smaller than the size of the application program by exploiting information usually available in an operating system (OS). Unnecessary impact on the application program code can be avoided by managing the interactions of the memory and processor as part of a task switch functionality within the OS instead of having an interaction with the application program code. However, such an approach involves two specific complexities to be addressed in an interrelated manner. Firstly, an OS task usually does not provide a granularity sufficient for load anticipation. Secondly, there are multiple aspects of OS scheduling to be supported for proper operation. At least priority based scheduling must be supported, since this is the most common scheduling algorithm utilized by all real-time operating system implementations. Solutions for these two main issues involving specific interactions to support multiple scheduling methodologies, at least a priority based scheduling, and the change of abstraction to support load units that permit load balancing on a granularity finer than an OS task while still interacting on the task level are provided.

The ability is provided to support multiple scheduling mechanisms in accordance with the scheduling complexity of operating systems. In accordance with at least one embodiment, hardware is provided that supports the most basic scheduling function of an RTOS, priority based scheduling, and to extend this with further scheduling mechanisms. Control can be provided at task granularity, which is the abstraction of control within an OS scheduler. A system able to support a load anticipation that is based on the control information within an OS scheduler (and without further impact on the application software) provides a mechanism to overcome the significant difference in sizes between a task size (e.g., the larger task size of task B 304) and a sensible size for the load units (e.g., the smaller load unit size of the load units of load unit slots 311-314). Extensions are provided to support the above change in load abstraction. Loading of the multiple load units making up a task, as this is defined by a load sequence, is provided. An implementation in hardware is used to ensure an undesired impact on the application software. An implementation in hardware can further avoid erroneous anticipation that could impair real-time operation.

Organizing the processing of information in an information processing system can involve task scheduling, task execution, and task switching aspects. An operating system scheduler may use one or a combination of the following two basic scheduling algorithms: priority-based task assignment (with or without pre-emption, and priorities may be static or dynamic) and time-triggered scheduling (related to time-slicing, but may also be related to time-triggered task changes, e.g., alarms). Variances of these scheduling algorithms and variances of their combination may be utilized to implement or support further scheduling algorithms.

Priority-based task assignment can be performed as described below. At any time within the execution, the operating system scheduler defines a set of tasks that are runnable (running or ready for running, where a particular task state or task state name may be operating system dependent) and the priority order of these tasks. Possible kinds of changes that can be made to the set of tasks include a change of task priority (e.g., an increase or decrease in priority) and a change of task status (e.g., to a runnable state or from a runnable state). Changes to be made can be handled by the OS scheduler. Usually, an OS scheduler selects the runnable task having the highest priority as the one being executed.

The set of software tasks capable of running and permitted to run is identified. A subset of these tasks is identified based on one or more selection criterion. Such selection criterion or criteria may be defined by the task state, the task priority, or both. Information about the selected subset may be continuously exchanged with hardware supporting the load anticipation. A loading order, referred to as a load sequence, for load units corresponding to the functions to be performed by a task is determined.

Time-triggered scheduling can be performed as described below. The time of a (potential) task switch can be calculated and determined by an elapsed time, which may be known at time of calculation. There may be further dependencies on availability of resources, which may be evaluated at a (potential) task switch time. Only when those resources are available (and no higher priority task is also runnable), a potential task switch becomes an actual task switch. There may be further dependencies on task priority, such as priority elevation, which can affect potential task switch time.

Tasks of an operating system instance may run independently and concurrently. Dependencies can be handled by specific resources/events under software control. The actual task switch can be performed under software control (e.g., by the OS scheduler). A task may continue to run until completion or until being pre-empted by the OS. Conceptually, there are relatively few events that can trigger a task switch. For example, a task can be started by the OS, a task can be activated by the OS, a task can terminate itself or be terminated by the OS, a task can wait for a resource/event (and dependency on a resource, event, etc., can be handled separately), and a task can be pre-empted by the OS. In any case, the task either starts at its entry function or continues at the previous point of execution.

A certain set of OS schedulers or a certain subset of the scheduling mechanisms also supports some form of time triggered scheduling. Time-slicing assigns a certain amount of process time to a task. A resource may become available after a predefined period of time. A task priority may be elevated after waiting for some time, causing a later task switch due to this change in priority. An alarm may trigger the execution of a task after some time, or at least a re-evaluation of the corresponding task priorities. All of the above situations are considered a functionality of a time-triggered task switch and may be handled by a common hardware construct (e.g., a timer, optionally combined with an interrupt service routine (ISR)).

In the OTC context, a time-triggered anticipation utilizes some additional functionality for two reasons. Firstly, a load anticipation of the corresponding task code shall be triggered in addition (to ensure the code is available in time). Secondly, corresponding operation is performed in hardware (no additional interrupt load on the processor is required). In addition, some integration with a priority-based scheduling scheme is provided.

In accordance with at least one embodiment, an apparatus for the scheduling of operations, comprises a bus master; an internal memory; an interconnect coupled to the plurality of bus masters and to the internal memory; an observer circuit coupled to the interconnect and configured to observe the transactions of the bus master at the interconnect and to generate notifications for events of interest; and a controller circuit coupled to the observer circuit and configured to receive the notifications and to interact via a register interface with an operating system (OS) scheduler controlling application software execution of application software, the controller circuit comprising a scheduling structure comprising M register slots implementing a set of N anticipation windows reflecting N top priority tasks, the controller circuit further configured to update contents of an anticipation window upon an OS scheduler notification about changes in the N top priority tasks, to update the contents of the anticipation window of the highest priority runnable task upon a notification of the notifications by the observer circuit, to create, upon modifying a register slot of the M register slots within an anticipation window, an event selected from a group consisting of: an observation event specified for and associated with an observation unit identified by an earlier content of the register slot, an observation event specified for and associated with an observation unit identified by new content of the register slot, and an anticipation event associated with an observation unit within the register slot within the anticipation window, to perform an operation selected from a group consisting of observation operation and an anticipation operation, the operation triggered by the event.

In accordance with at least one embodiment, a finer granularity of the event than task priority and state changes of an OS task is achieved by subdividing an object code of the application software corresponding to the OS task along function boundaries into one or multiple observation units, where an observation unit of the observation units comprises of one or multiple functions. In accordance with at least one embodiment, the anticipation operation is related to an observation unit or a further observation unit related to the observation unit as specified within an order criterion specified within metadata for the observation unit. In accordance with at least one embodiment, a number of the N of top priority tasks reflected by the set of N anticipation windows is greater or equal to 1 and less or equal to 32. In accordance with at least one embodiment, an assignment of a subset of the M register slots of the scheduling structure to a task of the N top priority tasks is performed by the controller circuit upon the OS scheduler notification, wherein the task is assigned to become one of the N top priority tasks. In accordance with at least one embodiment, changes within a task of the N top priority tasks correspond to a change of a task priority or a change of a status of the task from a runnable state to a not runnable state or from the not runnable state to the runnable state, wherein upon being notified about a corresponding change the controller circuit updates the contents of the anticipation window. In accordance with at least one embodiment, the events of interest reported by the observer element circuit correspond to reporting based on addresses accessed by the bus master.

In accordance with at least one embodiment, updating the contents of the anticipation window is performed by the controller circuit by adjusting a first register slot of the M register slots of a running task upon the notification by the observer circuit. In accordance with at least one embodiment, the order criterion specified within the metadata are utilized by the anticipation operation to identify one or multiple subsequent observation unit(s) that are referenced by the anticipation operation. In accordance with at least one embodiment, content updates of the anticipation window performed by the controller are defined by an order criterion specified for an observation unit, where the first register slot of the anticipation window defines a starting point, and wherein the contents of the anticipation window specify a maximum number of the observation units that can apply the anticipation operation. In accordance with at least one embodiment, a creation of the observation event is limited to a subset of the M register slots assigned to the anticipation window or to a specific update type of the M register slots. In accordance with at least one embodiment, the operation is performed by a specific hardware element, wherein the selection of the operation and the specific hardware element is specified in the metadata for the observer circuit. In accordance with at least one embodiment, the operation is performed in a context of the observation unit as defined by the first register slot in the anticipation window. In accordance with at least one embodiment, an anticipation operation is performed in a first context of the observation unit as defined by the first register slot in the anticipation window or in a second context of a dependent observation unit as defined by an order criterion defined within the metadata for the observation unit.

The preceding description in combination with the Figures was provided to assist in understanding the teachings disclosed herein. The discussion focused on specific implementations and embodiments of the teachings. This focus was provided to assist in describing the teachings, and should not be interpreted as a limitation on the scope or applicability of the teachings. However, other teachings can certainly be used in this application. The teachings can also be used in other applications, and with several different types of architectures.

In this document, relational terms such as "first" and "second," and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Other embodiments, uses, and advantages of the disclosure will be apparent to those skilled in the art from consideration of the specification and practice of the disclosure disclosed herein. The Specification and Drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

In addition, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The terms "substantially," "about," and their variants, as used herein are intended to refer to the qualified article being sufficient to achieve the stated purpose or value in a practical manner, which includes taking into account any minor imperfections or deviations, if any, that arise from usual and expected abnormalities that may occur during device operation, which are not significant for the stated purpose or value. In addition, the term "substantially" has further been defined herein in the context of specific attributes to identify specific ranges.

The invention claimed is:

1. An apparatus for the scheduling of operations, comprising:
   a bus master;
   an internal memory;
   an interconnect coupled to the bus master and to the internal memory;
   an observer circuit coupled to the interconnect and configured to observe transactions of the bus master at the interconnect and to generate notifications for events of interest; and
   a controller circuit coupled to the observer circuit and configured to receive the notifications and to interact via a register interface with an operating system (OS) scheduler controlling application software execution of application software, the controller circuit comprising:
      a scheduling structure comprising M register slots implementing a set of N anticipation windows reflecting N top priority tasks, the controller circuit further configured:
         to update contents of an anticipation window upon an OS scheduler notification about changes in the N top priority tasks,
         to update the contents of the anticipation window of a highest priority runnable task upon a notification of the notifications by the observer circuit,
         to create, upon modifying a register slot of the M register slots within an anticipation window, an event selected from a group consisting of:
            an observation event specified for and associated with an observation unit identified by an earlier content of the register slot,
            an observation event specified for and associated with an observation unit identified by new content of the register slot, and
            an anticipation event associated with an observation unit within the register slot within the anticipation window, and
         to perform an operation selected from a group consisting of observation operation and an anticipation operation, the operation triggered by the event,
      wherein changes within a task of the N top priority tasks correspond to a change of a task priority or a change of a status of the task from a runnable state to a not runnable state or from the not runnable state to the runnable state, wherein upon being notified about a corresponding change the controller circuit updates the contents of the anticipation window.

2. The apparatus of claim 1 wherein a finer granularity of the event than task priority and state changes of an OS task is achieved by subdividing an object code of the application software corresponding to the OS task along function boundaries into one or multiple observation units, where an observation unit of the observation units pertains to one or multiple functions.

3. The apparatus of claim 2 wherein the anticipation operation is related to an observation unit or a further observation unit related to the observation unit as specified within an order criterion specified within metadata for the observation unit.

4. The apparatus of claim 3 wherein the order criterion specified within the metadata are utilized by the anticipation operation to identify one or multiple subsequent observation unit(s) that are referenced by the anticipation operation.

5. The apparatus of claim 4 wherein the operation is performed by a specific hardware element, wherein the selection of the operation and the specific hardware element is specified in the metadata for the observer circuit.

6. The apparatus of claim 1 wherein a number of the N of top priority tasks reflected by the set of N anticipation windows is greater or equal to 1 and less or equal to 32.

7. The apparatus of claim 1 wherein an assignment of a subset of the M register slots of the scheduling structure to a task of the N top priority tasks is performed by the controller circuit upon the OS scheduler notification, wherein the task is assigned to become one of the N top priority tasks.

8. The apparatus of claim 1 wherein the events of interest reported by the observer element circuit correspond to reporting based on addresses accessed by the bus master.

9. The apparatus of claim 1 wherein content updates of the anticipation window performed by the controller are defined by an order criterion specified for an observation unit, where the first register slot of the anticipation window defines a starting point, and wherein the contents of the anticipation window specify a maximum number of the observation units that can apply the anticipation operation.

10. The apparatus of claim 1 wherein a creation of the observation event is limited to a subset of the M register slots assigned to the anticipation window or to a specific update type of the M register slots.

11. An apparatus for the scheduling of operations, comprising:
    a bus master;
    an internal memory;
    an interconnect coupled to the bus master and to the internal memory;
    an observer circuit coupled to the interconnect and configured to observe transactions of the bus master at the interconnect and to generate notifications for events of interest; and
    a controller circuit coupled to the observer circuit and configured to receive the notifications and to interact via a register interface with an operating system (OS) scheduler controlling application software execution of application software, the controller circuit comprising:
       a scheduling structure comprising M register slots implementing a set of N anticipation windows reflecting N top priority tasks, the controller circuit further configured:
          to update contents of an anticipation window upon an OS scheduler notification about changes in the N top priority tasks,
          to update the contents of the anticipation window of a highest priority runnable task upon a notification of the notifications by the observer circuit,
          to create, upon modifying a register slot of the M register slots within an anticipation window, an event selected from a group consisting of:
             an observation event specified for and associated with an observation unit identified by an earlier content of the register slot,
             an observation event specified for and associated with an observation unit identified by new content of the register slot, and
             an anticipation event associated with an observation unit within the register slot within the anticipation window, and to perform an operation selected from a group consisting of observation operation and an anticipation operation, the operation triggered by the event,
wherein updating the contents of the anticipation window is performed by the controller circuit by adjusting a first register slot of the M register slots of a running task upon the notification by the observer circuit.

12. The apparatus of claim 11 wherein the operation is performed in a context of the observation unit as defined by the first register slot in the anticipation window.

13. The apparatus of claim 11 wherein an anticipation operation is performed in a first context of the observation unit as defined by the first register slot in the anticipation window or in a second context of a dependent observation unit as defined by an order criterion defined within the metadata for the observation unit.

14. A method for the scheduling of operations, comprising:
observing, by an observer circuit coupled to an interconnect, transactions of a bus master at the interconnect, the interconnect coupled to the bus master and an internal memory;
generating, by the observer circuit, notifications for events of interest;
receiving the notifications at a controller circuit coupled to the observer circuit;
interacting, by the controller circuit, via a register interface, with an operating system (OS) scheduler controlling application software execution of application software, wherein the controller circuit comprises a scheduling structure comprising M register slots implementing a set of N anticipation windows reflecting N top priority tasks;
updating, by the controller circuit, contents of an anticipation window upon an OS scheduler notification about changes in the N top priority tasks;
updating, by the controller circuit, the contents of the anticipation window of a highest priority runnable task upon a notification of the notifications by the observer circuit;
creating, by the controller circuit, upon modifying a register slot of the M register slots within an anticipation window, an event selected from a group consisting of:
an observation event specified for and associated with an observation unit identified by an earlier content of the register slot,
an observation event specified for and associated with an observation unit identified by new content of the register slot, and
an anticipation event associated with an observation unit within the register slot within the anticipation window; and
performing, by the controller circuit, an operation selected from a group consisting of observation operation and an anticipation operation, the operation triggered by the event,
wherein changes within a task of the N top priority tasks correspond to a change of a task priority or a change of a status of the task from a runnable state to a not runnable state or from the not runnable state to the runnable state, wherein upon being notified about a corresponding change the controller circuit updates the contents of the anticipation window.

15. The method of claim 14 wherein a finer granularity of the event than task priority and state changes of an OS task is achieved by subdividing an object code of the application software corresponding to the OS task along function boundaries into one or multiple observation units, where an observation unit of the observation units pertains to one or multiple functions.

16. The method of claim 15 wherein the anticipation operation is related to an observation unit or a further observation unit related to the observation unit as specified within an order criterion specified within metadata for the observation unit.

17. The method of claim 16 wherein the order criterion specified within the metadata are utilized by the anticipation operation to identify one or multiple subsequent observation unit(s) that are referenced by the anticipation operation.

18. An apparatus for the scheduling of operations, comprising:
a bus master;
an internal memory;
an interconnect coupled to the bus master and to the internal memory;
an observer circuit coupled to the interconnect and configured to observe transactions of the bus master at the interconnect and to generate a notification based on an observed transaction; and
a controller circuit coupled to the observer circuit and configured to receive the notification and to interact via a register interface with an operating system (OS) scheduler controlling application software execution of application software, the controller circuit comprising:
a scheduling structure comprising M register slots implementing a set of N anticipation windows reflecting N top priority tasks, the controller circuit further configured:
to update contents of an anticipation window upon an OS scheduler notification about a change in at least one of the N top priority tasks,
to update the contents of the anticipation window of a highest priority runnable task upon the notification by the observer circuit,
to create, upon modifying a register slot of the M register slots within an anticipation window, an event selected from a group consisting of:
an observation event specified for and associated with an observation unit identified by content of the register slot, and
an anticipation event associated with an observation unit within the register slot within the anticipation window, and
to perform an operation selected from a group consisting of observation operation and an anticipation operation, the operation triggered by the event,
wherein content updates of the anticipation window performed by the controller are defined by an order criterion specified for an observation unit, where the first register slot of the anticipation window defines a starting point, and wherein the contents of the anticipation window specify a maximum number of the observation units that can apply the anticipation operation.

19. The apparatus of claim 18 wherein updating the contents of the anticipation window is performed by the controller circuit by adjusting a first register slot of the M register slots of a running task upon the notification by the observer circuit.

\* \* \* \* \*